(12) United States Patent
Winner et al.

(10) Patent No.: US 7,551,917 B1
(45) Date of Patent: Jun. 23, 2009

(54) TELECOMMUNICATIONS PROVISIONING SYSTEM AND METHOD USING CONCURRENT PROCESSES TO PROVIDE DIFFERENT ASPECTS OF TELECOMMUNICATIONS SERVICE

(75) Inventors: Angela Winner, Olathe, KS (US); Scharlene Garrett, Lees Summit, MO (US); Suit Kuppusamy, Overland Park, KS (US); Azam Bhatti, Overland Park, KS (US); Jennifer Warne, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 592 days.

(21) Appl. No.: 10/280,153

(22) Filed: Oct. 25, 2002

Related U.S. Application Data

(60) Provisional application No. 60/404,788, filed on Aug. 19, 2002.

(51) Int. Cl.
*H04M 3/42* (2006.01)
(52) U.S. Cl. .............................. 455/414.1; 705/7; 705/8; 705/9; 705/26; 705/28; 379/27.01; 379/29.05; 370/249
(58) Field of Classification Search ................. 455/414, 455/414.1; 705/1, 7, 8, 9, 28, 26; 379/201.12, 379/207.02, 27.01, 29.05, 241, 1.01; 370/249
See application file for complete search history.

(56) References Cited

U.S. PATENT DOCUMENTS

| | | | | |
|---|---|---|---|---|
| 5,644,619 A | * | 7/1997 | Farris et al. ............. | 379/29.01 |
| 5,881,131 A | * | 3/1999 | Farris et al. ............. | 379/15.03 |
| 6,104,798 A | * | 8/2000 | Lickiss et al. ........... | 379/201.12 |
| 6,185,603 B1 | | 2/2001 | Henderson et al. | |
| 6,298,352 B1 | * | 10/2001 | Kannan et al. .............. | 707/102 |
| 6,546,095 B1 | * | 4/2003 | Iverson et al. ........... | 379/201.12 |
| 6,661,888 B2 | * | 12/2003 | Bell et al. ............... | 379/221.13 |
| 6,662,221 B1 | * | 12/2003 | Gonda et al. ................ | 709/223 |
| 6,735,293 B2 | * | 5/2004 | Doherty et al. ......... | 379/201.12 |
| 6,775,658 B1 | | 8/2004 | Zothner | |
| 6,778,651 B1 | * | 8/2004 | Jost et al. ............... | 379/201.01 |
| 6,922,413 B1 | * | 7/2005 | Hume et al. ................. | 370/410 |
| 6,937,594 B2 | * | 8/2005 | Smith et al. ................. | 370/352 |
| 6,937,993 B1 | * | 8/2005 | Gabbita et al. ................ | 705/8 |

(Continued)

OTHER PUBLICATIONS

Vitria Business Cockpit Brochure, 2001.

(Continued)

*Primary Examiner*—Alexander Eisen
*Assistant Examiner*—Aung T Win

(57) ABSTRACT

A system and method are disclosed having concurrent processes that install different aspects of telecommunications service. In one embodiment, the provisioning method may comprise: (a) accepting order entry notifications; and (b) initiating an initiator process for each order entry notification. The initiator process in turn initiates a set of processes that operate concurrently to provide different aspects of a telecommunications service. The processes in the set may include an access process that arranges for installation of a connection between a premises and a communications network, and a truck roll process configured to arrange for a separate visit to the premises for installing equipment. Alternatively, the processes may include an equipment ordering process that arranges for the procurement of equipment to be installed on the premises, a local number porting process that arranges for transfer of a phone number, and a virtual components process that arranges for programming of network switches.

19 Claims, 12 Drawing Sheets

U.S. PATENT DOCUMENTS

| | | |
|---|---|---|
| 6,963,847 B1 | 11/2005 | Kennedy et al. |
| 7,295,990 B1 | 11/2007 | Braumoeller et al. |
| 7,318,043 B1 | 1/2008 | Silver et al. |
| 7,379,903 B2 * | 5/2008 | Caballero et al. ............. 705/26 |
| 2002/0055878 A1 | 5/2002 | Burton et al. |
| 2002/0138378 A1 * | 9/2002 | Leskuski ..................... 705/34 |
| 2002/0161859 A1 | 10/2002 | Willcox et al. |
| 2002/0199203 A1 * | 12/2002 | Duffy et al. ................. 725/109 |
| 2003/0061068 A1 * | 3/2003 | Curtis ........................... 705/1 |
| 2004/0111286 A1 | 6/2004 | Koenig et al. |
| 2004/0190699 A1 | 9/2004 | Doherty et al. |
| 2006/0178951 A1 | 8/2006 | Rund, III |

OTHER PUBLICATIONS

Vitria Communicator Data Sheet, 2001.

Vitria Communicator Product Brief, 2001.

Vitria Architecture Overview, May 22, 2002.

Raj Sripathi, et al., "Process Design for an Order Fulfillment Method and System", U.S. Appl. No. 10/280,155, filed Oct. 25, 2002.

Angela Winner, et al., "A Customer Want Date (CWD) Oriented Telecommunications Service Provisioning System and Method", U.S. Appl. No. 10/280,289, filed Oct. 25, 2002.

Office Action dated Feb. 13, 2008, U.S. Appl. No. 10/280,155, 13 pages (IDF 2100; 4000-09600).

Office Action dated Apr. 4, 2008, U.S. Appl. No. 10/280,298, 12 pages (4000-09700).

Final Office Action dated Aug. Aug. 4, 2008, U.S. Appl. No. 10/280,155, 11 pages (4000-09600).

Final Office Action dated Oct. 17, 2008, U.S. Appl. No. 10/280,289, 11 pages (4000-09700).

* cited by examiner

TELECOMMUNICATIONS PROVISIONING SYSTEM AND METHOD USING CONCURRENT PROCESSES TO PROVIDE DIFFERENT ASPECTS OF TELECOMMUNICATIONS SERVICE

CROSS-REFERENCE TO RELATED APPLICATIONS

The present application claims priority to Provisional Application 60/404,788 filed Aug. 19, 2002 entitled "Telecom Provisioning Workflow Models" which is incorporated by reference. The present application related to U.S. patent application Ser. No. 10/280,289 (IDF 2099 [4000-09700]), and U.S. patent application Ser. No. 10/2802155 (IDF 2100 [4000-09600]), both of which are filed concurrently herewith and incorporated by reference.

BACKGROUND

Enterprise Integration

Existing companies often employ a variety of computer systems as part of their business. Examples of such computer systems may include: order entry systems used by sales representatives, order fulfillment systems used by warehouse employees, resource planning systems used by managers, and billing systems used by accountants. Although these systems are typically acquired and operated independently of the other systems, the ability to coordinate these systems offers opportunities for improvement. Such improvements may include reduced waste, reduced delivery delays, faster billing, and more responsive customer service.

The coordination of independent (and often incompatible) computer systems within a company is the focus of the field of enterprise integration. Similar coordination between computer systems of different companies (e.g., a manufacturer and its suppliers) is the focus of the field of "ebusiness". The ebusiness and enterprise integration fields have produced a number of products including Vitria BusinessWare.

Vitria BusinessWare is a software platform, i.e. a software package that provides low level services to support user-created processes. In the case of Vitria BusinessWare, these low-level services include connectors, channels, databases, and automators.

Connectors are software modules that translate messages between different formats. Connectors allow messages to be exchanged between incompatible computer systems.

Channels are software modules that queue messages. Channels provide a versatile mechanism for inter-process communications in distributed systems. Channels may be established for certain message types, and every process that subscribes to a given channel is able to receive the messages placed into the channel. Channels may greatly facilitate the scalability of processes running on the platform.

A database is a software module that allows for organizing and accessing a collection of information. In the BusinessWare context, the databases are used to store customer orders along with associated business process objects. The databases are further used to organize state information for the business process objects.

"Business process object" is a term for an instance of a business process. The business process object (BPO) progresses through a series of model states as a company carries out its business operations. Consider and example of a business process for a service provider. The customer order is initially just a request. The company may accept the order, may obtain and allocate resources for fulfilling the order, may deploy the resources, may provide the service, and may bill the customer. As the company takes each of these actions, the customer order progresses through a series of states. This process may be formalized into a business process model, and each customer order formalized as a business process object.

Also included in Vitria BusinessWare are automators. The automators are software modules that move the business process objects (BPOs) through the states in a business process model. The automators may act in response to messages received through channels, and may generate messages or take other actions as BPOs transition to and from model states. Note that at any given time, each BPO may be associated with multiple models and multiple model states.

Vitria also provides an authoring environment for creating and editing business process models. The authoring environment allows the user to specify different state types, specify transitions between states, and specify conditions and actions associated with the transitions. There are four characteristics that may be associated with any given state: start, terminate, wait, and nested. Start states are states initially associated with a BPO when the model is initiated. Terminate states are states that stop the BPO's progression through the model. States that are not start or terminate states are intermediate states. Wait states are states that cannot be exited until specified conditions are met. States that are not wait states are sometimes called action states, but in any event, they are states through which BPOs can move en route to subsequent states. Nested states are states that represent a sub-model. BPOs that enter a nested state initiate the sub-model in the form of a new BPO that progress through the sub-model states. When a sub-model terminates, the parent BPO may exit the nested state. States that are not nested states are termed simple states.

Details regarding Vitria BusinessWare and its use may be obtained from Vitria which is located in Sunnyvale, Calif., and on the web at www.vitria.com. Vitria BusinessWare is just one example of an enterprise integration platform. Others are commercially available, and many companies have implemented custom information technology solutions.

Telecommunications Service Providers

Telecommunications Service Providers (TSPs) are evolving as technology offers new service opportunities. In addition to basic telephone service, modern TSPs are providing automated switching, automated directory assistance, automatic number identification, automatic call blocking, customized ring tones, call waiting, call forwarding, automatic call back, automatic redial, conference calling, voice mail, call tracing, and emergency 911 location information. In addition, many TSPs are providing wireless access, automated billing, speed dialing, voice dialing, internet access, and broadband services including: digital subscriber links (DSL), simultaneous voice and data transport, and video conferencing. A few TSPs are venturing into new markets including: entertainment on-demand, and interactive television. Although the requirements for providing each of these services may overlap somewhat, the requirements are nonetheless different for each service.

Existing TSPs typically have many independent computer systems which need to inter-operate, even for just the process of providing new services to customers. The existing process for installing broadband-related services takes 45 days on average, and there is quite a bit of variance around this number. During the installation process, necessary steps are routinely missed or performed out of order, causing wasted effort, unhappy customers, and lost revenues. A formal, automated telecommunications provisioning process has been designed as disclosed below. The process is expected to reduce the average installation time to less than 15 days, and to greatly enhance the consumer experience. Further, the process is easily revised should further improvements be discovered.

SUMMARY

Accordingly, there is disclosed herein a telecommunications provisioning system and method using concurrent processes to provide different aspects of telecommunications service. In one embodiment, the provisioning method may comprise: (a) accepting order entry notifications; and (b) initiating an initiator process for each order entry notification. The initiator process in turn initiates a set of processes that operate concurrently to provide different aspects of a telecommunications service. The processes in the set may include an access process that arranges for installation of a connection between a premises and a communications network, and a truck roll process configured to arrange for a separate visit to the premises for installing equipment. Alternatively, the processes may include an equipment ordering process that arranges for the procurement of equipment to be installed on the premises, a local number porting (LNP) process that arranges for transfer of a phone number to the premises, and a virtual components process that arranges for the programming of network switches to accept communications directed to and from the premises.

BRIEF DESCRIPTION OF THE DRAWINGS

A better understanding of the present invention can be obtained when the detailed description below is considered in conjunction with the drawings, in which.

Figure 1:
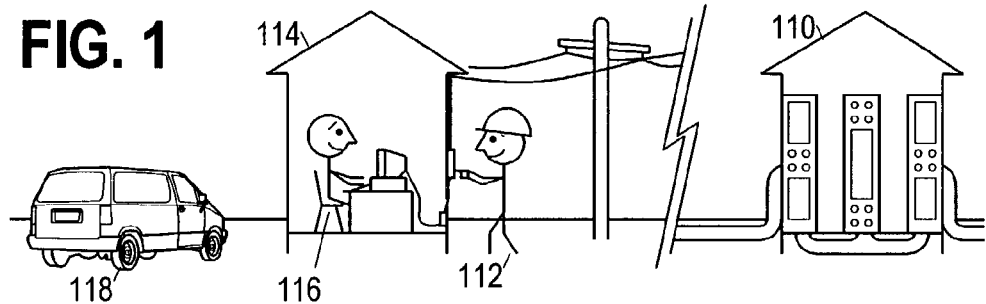
FIG. 1 shows an environment in which telecommunications service providers (TSPs) may operate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now the figures, FIG. 1 shows an environment in which a telecommunications service provider (TSP) may operate. The TSP provides an infrastructure that supports communications between customers. The infrastructure includes a network of wires, cables, optical fibres, wireless links, and/or satellite links. The network is controlled by a hierarchy of switching centers 110.

A TSP technician 112 connects the network to a premises 114, typically by connecting a wire or cable to a junction box. The technician typically verifies the physical connection by testing his access to the network from the junction box. The access may include voice access and broadband access.

A customer 116 can then access other customers via the network if the customer has the proper equipment. In many cases, this equipment must be delivered 118 to the premises. The equipment may be installed by professional installers, and may alternatively be installed by the owner of the premises.

Figure 2:
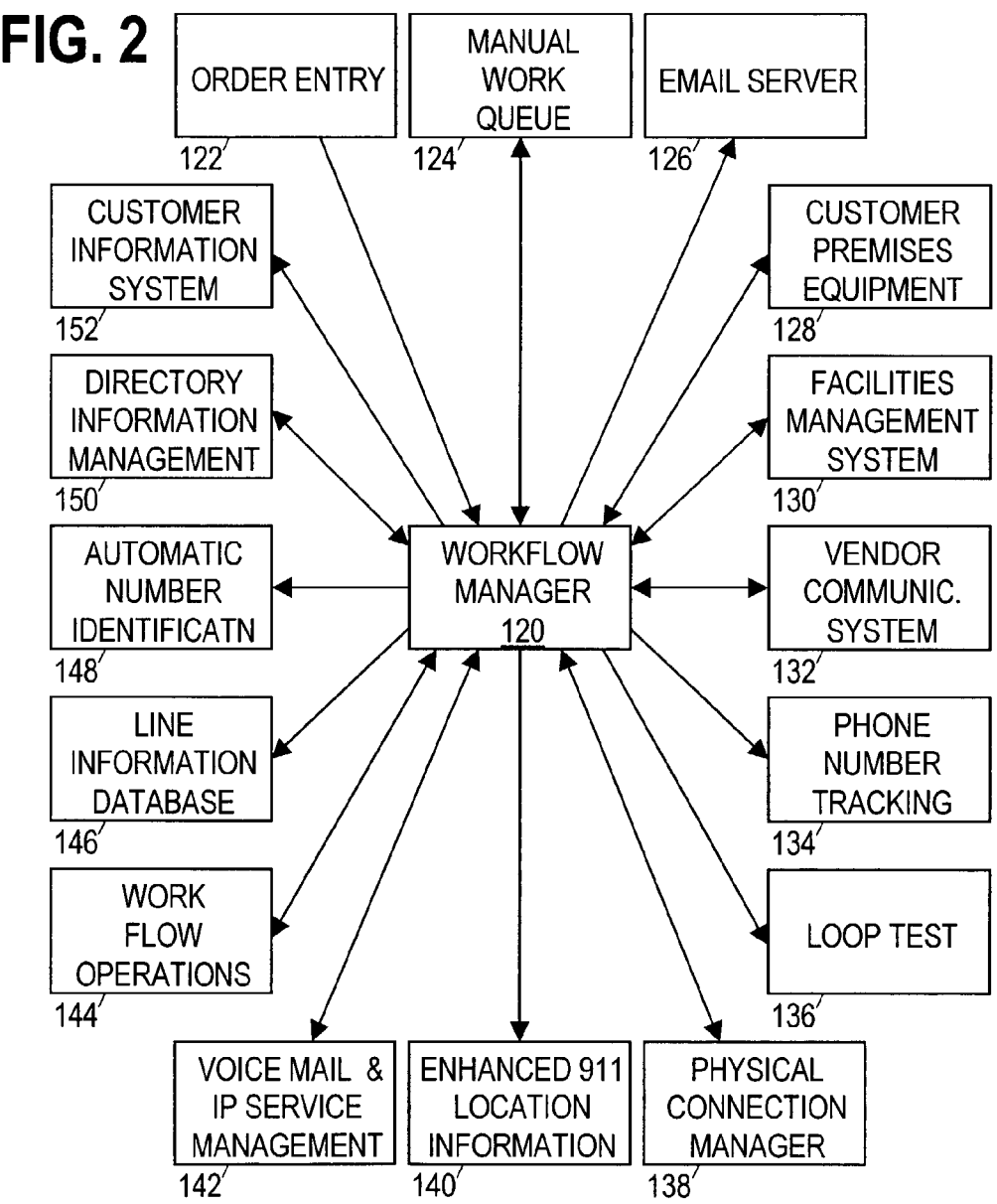
FIG. 2 shows an exemplary system configuration of a TSP.

FIG. 2 shows an example of a system which may be used by a TSP to provision a new customer with telecommunications services. Each of the blocks in FIG. 2 may represent a network of computers that perform distributed processing, along with any support staff necessary to implement the identified function. Workflow manager 120 is an automated system that coordinates the operations of the other blocks in FIG. 2 through the use of business process models.

Order entry system 122 is a system which may be used by sales representatives or customer service representatives to enter orders for services provided by the TSP. It may be associated with a customer order database that stores customer order information for ready access by the workflow manager system 120 and other systems. A new service order may cause the order entry system 122 to notify the workflow manager 120 to initiate an order fulfillment process.

Manual work queue system 124 is a system which may be used by the workflow manager system 120 to prompt workers to perform certain tasks. This may include such tasks as: obtaining an item from inventory, delivering an item to a given address, installing a physical connection, placing a follow-up phone call with a customer, and resolving problems with a particular order. The manual work queue system 124 may notify the workflow manager system 120 when a task has been completed. It is expected the manual work queue system 124 may not notify the workflow manager system of completion of some task types.

Email server system 126 is a system which may be used by the workflow manager system 120 to notify interested parties of certain milestones in the order fulfillment process. Examples of interested parties may include sales representatives, businesses that work closely with the TSP, and businesses that are responsible for the customer's bills.

Customer premises equipment system 128 is a system which may be used by the workflow manager system 120 to handle the logistics of getting customer premises equipment to the loading dock. Customer premises equipment (CPE) is a term for the equipment that is needed on the customer's premises to use the service desired by the customer. CPE does not include the junction box and wiring. It may include telephone handsets, broadband modems, and for larger customers, a telephone switch. The customer commonly does not have a broadband modem when ordering broadband service, and it is customary to provide the modem with a new broadband service order. Other CPE may typically be purchased by the customer from the TSP.

CPE system 128 may be a warehousing system that tracks an inventory and directs the storage and retrieval of warehouse items. Alternatively, CPE system 128 may be a CPE manufacturer's ordering system. In any event, the CPE system 128 may acknowledge receipt of messages from the workflow manager system 120.

Facilities management system 130 is a system that may be used by the workflow manager system 120 to have a physical connection established between the network and the customer premises. The facilities management system 130 may verify that the premises in within the TSP's service area and may confirm or deny the request from the workflow manager system 120 accordingly. If the premises is within the service area, the facilities management system 130 may schedule the installation of a physical connection absent an existing connection. A TSP technician will travel to the premises to perform any necessary installation, and to test the physical connection.

Vendor communications system 132 is a system that may be used by the workflow manager 120 to appropriately program the network switching centers to recognize the physical connection to the premises as a valid access point, and to accept and route communications to and from the premises. This programming establishes a "permanent virtual circuit" (PVC). A PVC is an allocation of network resources to carry communications to and from the premises. The actual physical links used to carry the communications may vary from time to time, hence the term "virtual". The term "dropside" is also used herein to describe a particular type of PVC.

Phone number tracking system 134 may be an external system shared by various TSPs to support local portability of phone numbers. In modern telephone networks, the various digits of a telephone number no longer correspond to different exchanges and switching centers. In order to determine the appropriate sequence of links to a given premises, the phone number tracking system may be used to map a given phone number to the appropriate route through the local switching centers. The workflow manager 120 may supply the phone number tracking system 134 with the appropriate information.

Loop test system 136 is a system that may be used by the workflow manager 120 to test the physical connection to the premises. This physical connection is historically termed the "loop" because for telephone service the connection in its idle state provides a closed electrical circuit.

Physical connection manager system 138 is a system that may be used by the workflow manager to determine an efficient switch configuration to best support the resource allocations needed by the virtual circuits.

Enhanced 911 (E911) location information system 140 may be an external system shared by various TSPs to support emergency service. In addition to the address, the E911 system may further associate a particular portion of the premises as the location associated with a phone number. The workflow manager 120 may supply the E911 location information system 140 with the appropriate information. The location information may be provided to the workflow manager 120 by the facilities management system 130 after installation by a TSP technician.

Voice mail and internet portal (IP) service management system 142 may include facilities for supporting voice mail services and internet access services. The workflow management system 120 may cooperate with the voice mail and IP service management system 142 to establish the appropriate customer accounts on system 142.

Work force operations system 140 is a system that may be used by the workflow manager system 120 to schedule equipment delivery to the premises. Work force operations system 140 may direct drivers to gather equipment from the loading dock and deliver it to specified addresses. Deliveries may be prioritized by "customer want date", i.e. the date that the customer expects service to commence.

Line information database (LIDB) system 146 may be a transaction-oriented database that logs successful connections. Such systems may be used to store origin and destination telephone numbers along with special billing number data. These records may be used to process and bill "alternately billed services", i.e. services to which special tolls apply or services which are billed to an account that is not associated with the origination number. Workflow manager system 120 may notify the LIDB system 146 of accounts associated with new phone numbers.

Automatic number identification (ANI) system 148 may be a system for providing various ANI features, including caller id, call blocking, automatic call back, selective call forwarding, etc. Workflow manager system 120 may notify ANI system 148 of the number and service subscription information newly associated with the physical connection to the customer premises. Customized ring signals may also be provided by ANI system 148.

Directory information management system 150 may be a system used to store directory information. Such systems may be used to publish directory listings (i.e. phone books) and to provide directory assistance. Workflow manager 120 may notify the directory information management system 150 of new phone numbers and the directory information associated with those phone numbers.

Customer information system 152 may be a system used to store and organize customer account information. Such systems may be used in the billing and collection of revenue for telecommunications services. Workflow manager 120 may notify the customer information system of new accounts and may provide appropriate information to be associated with those accounts. In particular, the workflow manager may provide prompt notification of new services provided to a customer account, and may provide such notification as each new service is added rather than waiting for the full installation of a packaged set of services.

It may be evident, then, that a significant number of disparate systems are employed by a TSP in the provision of telecommunications services to a customer. The complex interrelations among these various systems have not been highlighted in the above discussion, but the end result is that the coordination of these systems can be an involved process. A telecommunications provisioning process is described below which may carry out this coordination in a robust, efficient manner that results in minimal delays to new customers. Further, this process may provide high visibility to the current state of every order as the provisioning process progresses. Still further, this process may include automated alerts to notify management of potential problems.

In one embodiment, workflow manager 120 implements a telecommunications provisioning process as a set of business process models on an enterprise integration platform. The ensuing description concerns a preferred set of models as shown in FIGS. 3-25, though it is recognized that many suitable variations may be used. In the figures, a square block is used to indicate a wait state, and a block with rounded corners is used to indicate a non-wait state. Blocks having double outlines indicate start states. Blocks with thin outlines indicate simple states. Blocks having bold outlines indicate nested states. Circles such as circle 186 in FIG. 3 indicate terminate states. This naming of state types is similar to that used by Vitria BusinessWare. Refer to the background for additional details.

Transitions between states may be associated with one or more events. The events may take the form of messages received by the workflow manager 120 and messages sent by the workflow manager 120.

Figure 3:
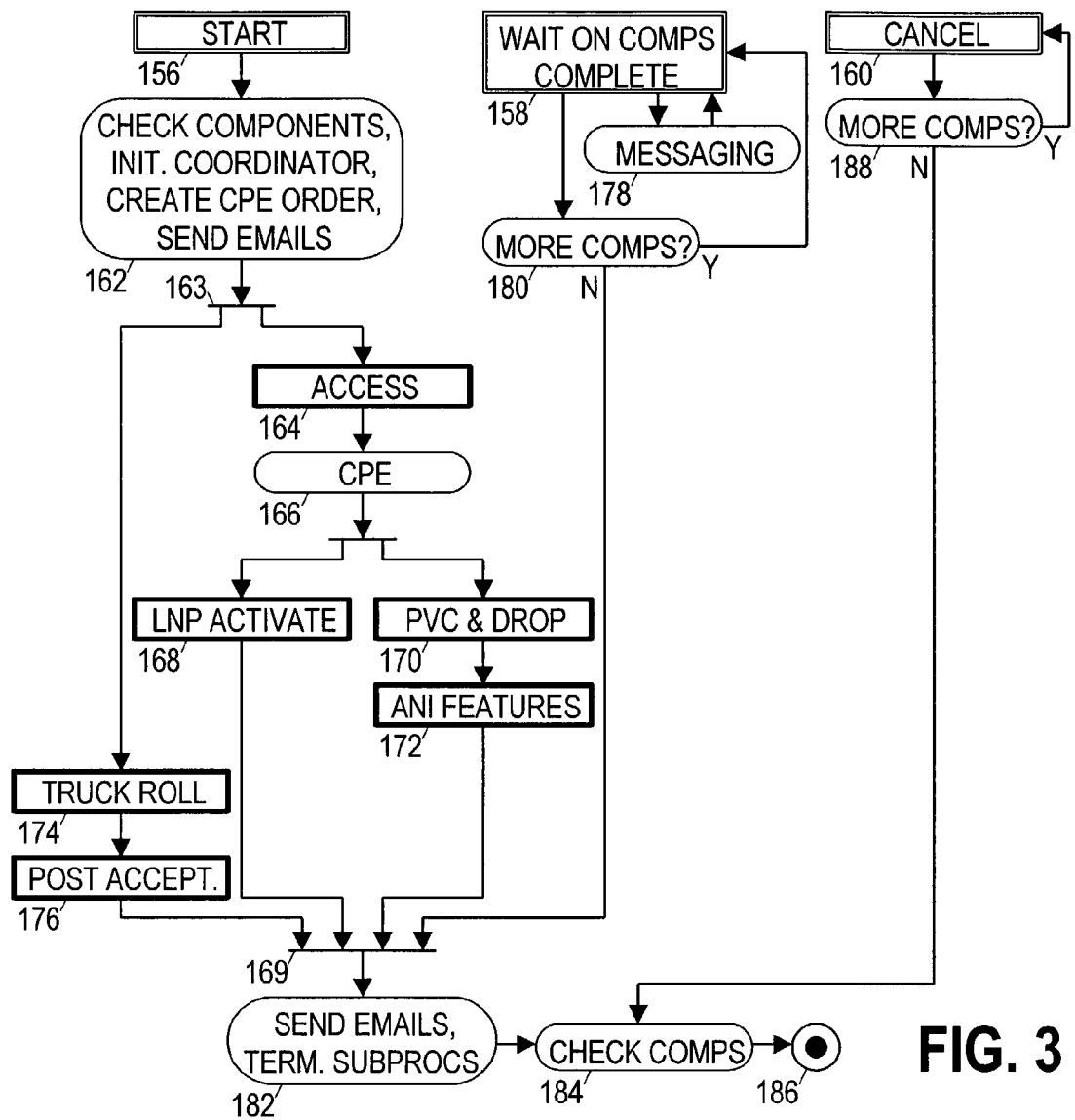
FIG. 3 shows one embodiment of an initiator process.

Symbol 163 in FIG. 3 represents a "fork" operation, which creates multiple parallel paths. The business process flow along each of the parallel paths may be independent of the flow along the other parallel paths, at least until a "join" operation (symbol 169) is reached. A join operation merges multiple parallel paths into a single path. Business process flows that reach a join operation along parallel paths preferably halt at the join until all parallel flows have reached the join. Once all flows have converged, a single business process flow emerges from the join operation.

Beginning then with FIG. 3, the workflow manager responds to the notification of a new service order by creating a new business process object, hereafter termed the "initiator" business process object (BPO). The initiator BPO may set in motion a number of "monitor" BPOs that in turn initiate and track "realization" BPOs.

The initiator BPO initially has three states associated with it: states 156, 158, and 160. Each of these states may be independently updated as the provisioning process progresses.

State 156 is a start state. The message that triggers the creation of the BPO may also cause the transition from start state 156 to state 162. Some processing may be associated with the transition to verify that all the necessary information has been provided to fulfill the order. The workflow manager 120 may also send a series of messages associated with this transition. These messages may include a message to initiate a "coordinator" BPO (to be discussed further below), a message to the CPE system 128 to order any necessary customer premises equipment, and a message to the email server system 126 to notify interested parties that the new order has been received.

Fork 163 creates two parallel paths which reach states 164 and 174. Focussing for the moment on the first path, state 164 is a nested state. When the workflow manager 120 reaches state 164, it initiates the "access" BPO. The access BPO is a monitor process that initiates and tracks the process for installing physical connections with customer premises. When the physical connections have been installed, the access BPO notifies the initiator BPO, and the initiator BPO may transition to CPE state 166.

This transition may cause the workflow manager 120 to send a message that initiates a CPE BPO. The CPE BPO may be a monitor process that initiates and tracks the installation of CPE. However, the initiator process may continue without waiting for notice of completion from the CPE BPO.

After leaving state 166, the initiator BPO forks again to reach states 168 and 170. State 168 is a nested state. The workflow manager may initiate a "local number portability activate" ("LNP activate") BPO, which is a monitor process that initiates and tracks the activation of phone numbers that are transferred from one local carrier to another. Once all such numbers have been activated, the LNP activate BPO notifies the initiator BPO, and the initiator BPO transitions out of state 168 to reach join 169.

State 170 is also a nested state. When the initiator BPO enters state 170, the workflow manager may initiate a "virtual components" BPO. The virtual components BPO is a monitor process that initiates and tracks the programming of switching centers to accept and direct communications to and from the customer premises. Once the programming is complete, the virtual components BPO notifies the initiator BPO, and the initiator BPO transitions to state 172.

State 172 is a nested state that causes the workflow manager to initiate an "automatic number identification features" ("ANI features") BPO. The ANI features BPO is a monitor process that initiates and tracks the configuration of the ANI system to provide customer-subscribed ANI services. Once the configuration is complete, the monitor process notifies the initiator BPO, and the initiator BPO reaches join 169.

Returning now to the second path from fork 163, the initiator BPO reaches nested state 174. The workflow manager initiates a "truck roll" BPO. The truck roll BPO is a monitor process that initiates and tracks a vehicle trip to the customer premises for delivery and/or installation of CPE. Once the vehicle trip is successfully completed, the truck roll BPO notifies the initiator BPO, and the initiator BPO transitions to state 176.

State 176 is a nested state that causes workflow manager 120 to initiate a "post-acceptance" BPO. The post-acceptance BPO is a realization process that performs various tests on the installed service components. When the tests are completed, the initiator BPO reaches join 169.

Three paths that reach join 169 have now been described. A fourth path yet remains. It originates in state 158, which is one of the start states associated with the initiator process. The initiator BPO may transition out of state 158 to state 178 upon receiving messages to change the service package or to change the customer want date (the date that the customer expects the service to commence). The workflow manager system 120 responds to such messages with an acknowledgement message. The initiator BPO may also transition from state 158 to state 178 upon expiration of a timer. The timer is preferably set to expire 48 hours before the customer want date.

State 178 is a non-wait state, so the initiator BPO immediately transitions back to state 158 after reaching state 178. As the initiator BPO makes this transition, the workflow manager system 120 sends an email reminder message to notify a system manager of the event that caused a transition to state 178. Such email reminders may be used by the system manager to monitor the operation of the system.

The initiator BPO may transition out of state 158 to state 180 upon receiving messages indicating completion of any of the following service components: access, CPE, PVC, dropside, E911, ANI features, LNP, voice mail, and group features. The workflow manager system 120 passes the completion message along to the customer order database. After reaching state 180, the initiator BPO determines whether all of the service components have been completed, or whether some yet remain. If some remain, the initiator BPO transitions back to state 158. Otherwise, the initiator BPO reaches join 169.

Once all four paths to join 169 have been traversed, the initiator BPO reaches state 182. From state 182, the initiator BPO transitions to state 184. As it does so, the workflow manager 120 transmits an email notice of completion to interested parties, transmits termination messages to the various monitor processes, and transmits a notice to the customer information system to begin billing. In state 184, the initiator BPO verifies that each of the monitor processes have terminated. From state 184, the initiator BPO transitions to state 186, where the BPO terminates.

State 160 is a third start state associated with the initiator BPO. The initiator BPO may transition from state 160 to state 180 upon receiving a message canceling the installation of a service component. When this occurs, the workflow manager system may transmit a message to the corresponding monitor BPO. In state 188, the initiator BPO determines whether any service component remain to be installed, and if so, the initiator BPO transitions back to state 160. Otherwise, the initiator BPO transitions to state 184, which has already been described.

It may be apparent to a reader considering the above description that a great number of BPOs may be concurrently operating during the telecommunications provisioning process. And yet, these BPOs are not simply launched simultaneously. Rather, they are initiated in a carefully designed order, with built-in concurrency where such concurrency may offer greater efficiencies. It is noted that variations in the initiator BPO may become apparent to one who considers the above description in light of different system configurations.

Figure 4:
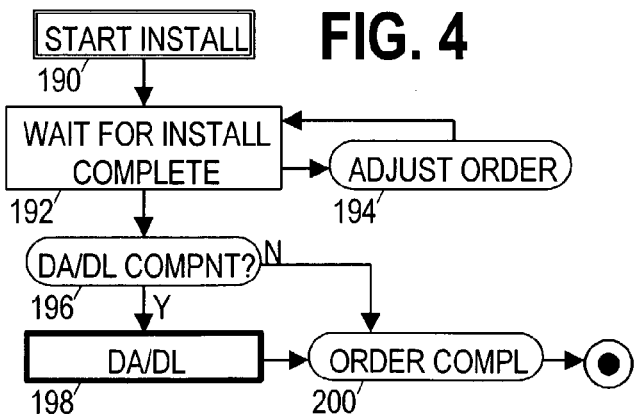
FIG. 4 shows an example of an initiator process extension.

FIG. 4 shows the coordinator BPO, which may be initiated by the workflow manager when the initiator BPO enters state 162. The coordinator BPO may serve as an extension of the initiator BPO, triggering one or more monitor processes after the initiator BPO terminates. FIG. 4 shows one start state 190 associated with the coordinator BPO. The message that initiates the coordinator BPO may also cause a transition from state 190 to 192. State 192 is a wait state from which the coordinator BPO may transition to state 194 in response to receiving a message indicating a change to the customer order. In state 194, the coordinator may adjust customer order information before transitioning back to state 192.

The coordinator BPO may transition from state 192 to state 196 when a message is received indicating that the various service components of the customer order have been installed. In state 196, the coordinator BPO determines whether the newly installed components include any components that would need to be listed in the phone directory. If so, the coordinator BPO transitions to nested state 198, where a "directory assistance/directory listing" ("DA/DL") BPO is initiated. Otherwise, the coordinator BPO may transition to state 200.

Once the DA/DL BPO terminates, the coordinator BPO may transition to state 200. State 200 is a non-wait state from which the coordinator BPO may transition to a terminate state. In making this final transition, the coordinator BPO may issue a successful completion message to the customer order database.

The foregoing description relates to initiator processes. The following description concerns monitor processes and their associated realization processes.

Figure 5:
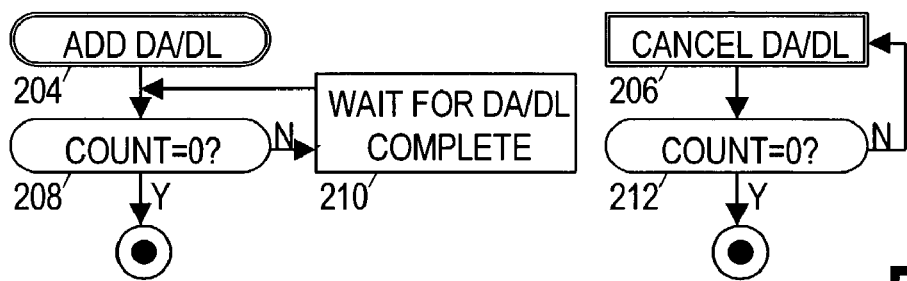
FIG. 5 shows one embodiment of a directory assistance/directory listing (DA/DL) monitor process.

FIG. 5 shows the DA/DL monitor process. The DA/DL BPO that is initiated by the coordinator BPO includes two start states 204 and 206. Start state 204 is a non-wait state, so immediately after the DA/DL BPO is initiated, it may transition from state 204 to state 208. As the BPO makes this transition, the workflow manager 120 sends a message that initiates the realization portion of the DA/DL monitor process (described below with reference to FIG. 6).

In state 208, the DA/DL BPO determines whether the directory information system has accepted the listing information for all of the components. If not, the BPO transitions to state 210. The BPO may transition from state 210 back to state 208 upon receiving a message indicating that the listing information for a component has been accepted. Once all the components having DA/DL information have been processed, the BPO terminates.

The DA/DL BPO may transition out of start state 206 to state 212 upon receiving a message indicating that a component having DA/DL information has been canceled. In state 212, the BPO determines whether there are any components having unprocessed DA/DL information left after the cancellation. If so, the BPO returns to state 206. Otherwise, the BPO terminates.

Figure 6:
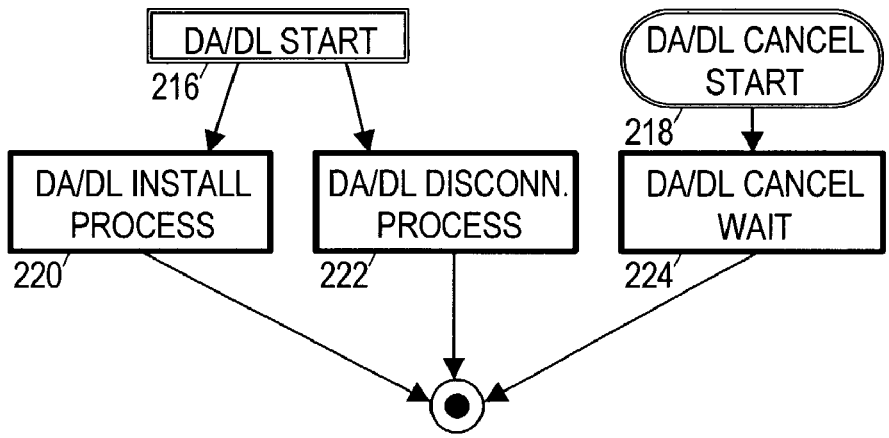
FIG. 6 shows one embodiment of a DA/DL interface process.

FIG. 6 shows a portion of the DA/DL realization process: the "DA/DL interface" BPO. The monitor process may act as a "pluralizer", initiating multiple DA/DL interface BPOs. The DA/DL BPO preferably initiates one DA/DL interface BPO for each service component having DA/DL information.

The DA/DL interface BPO may have two start states 216 and 218. The BPO may transition out of state 216 to state 220 in response to the message that created the DA/DL interface BPO. State 220 is a nested state that causes the initiation of a DA/DL install BPO. The DA/DL install BPO is a realization process that handles the system-specific protocols needed to create a new DA/DL listing on the DA/DL system. When the DA/DL install BPO terminates, the DA/DL interface BPO transitions to a terminate state, notifying the DA/DL BPO (in FIG. 5) as it does so.

Returning to state 216, the DA/DL interface BPO may transition out of state 216 to state 222 in response to a message from a remove scheduler. Not much will be said about the remove scheduler other than the fact that the remove scheduler is an initiator BPO used to disconnect telecommunications service components. The transition from state 216 to state 222 may be taken when the remove scheduler has initiated the DA/DL interface BPO. State 222 is a nested state that causes a disconnect DA/DL BPO to be initiated. The disconnect DA/DL is a realization BPO that handles the system-specific protocols needed to remove a DA/DL listing from the DA/DL system.

Start state 218 is a non-wait state, so when the DA/DL interface BPO is initiated, the BPO transitions to state 224. State 224 is a nested state that causes initiation of a DA/DL cancel BPO. Unlike a disconnect, a cancellation is a command received before an installation is complete. The DA/DL cancel BPO may be a realization BPO that halts and/or verifies cancellation of the service component. In a preferred embodiment, the DA/DL install BPO cancels the DA/DL listing when a cancel command is received, and the DA/DL cancel BPO merely verifies that the cancellation completes successfully.

Figure 7:
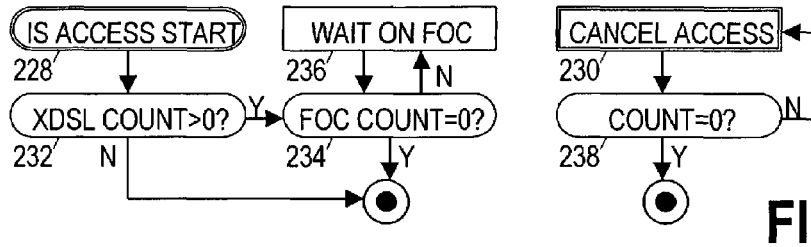
FIG. 7 shows one embodiment of an access monitor process.

FIG. 7 shows the access monitoring process, which may act as a pluralizer. The access BPO includes two start states 228 and 230. Start state 228 is a non-wait state, so the access BPO transitions to state 232 after the access BPO is initiated. During this transition, the workflow manager initiates an "access interface" BPO (described below with reference to FIG. 8) for each physical connection needed. In state 232, the access BPO determines whether any of the physical connections are for broadband service (xDSL). If not, the access BPO terminates. Otherwise, the access BPO transitions to state 234, where it determines whether firm order confirmations (FOC) have been received for each of the broadband service connections. If so, the access BPO terminates. The transition from state 234 to the terminate state may initiate a loop test BPO (described below with reference to FIG. 11). Otherwise, the access BPO transitions to state 236. State 236 is a wait state from which the access BPO transitions to state 234 when a message indicating a firm order confirmation is received.

From start state 230, the access BPO transitions to state 238 when a message indicating cancellation of service component requiring a physical connection. In state 238, the access BPO determines whether any physical connections are still needed after the cancellation. If not, the access BPO terminates. Otherwise, the access BPO returns to state 230.

Figure 8:
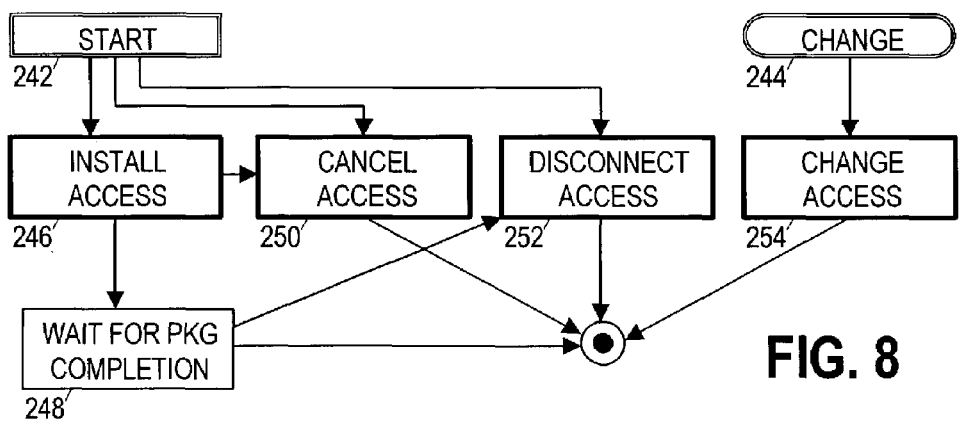
FIG. 8 shows one embodiment of an access interface process.

FIG. 8 shows the access interface BPO, which has two start states 242, 244. From state 242, the BPO transitions to states 246, 250, or 252, depending on whether the message that initiated the BPO is an "install" message, a "cancel" message, or a "disconnect" message. Each of these states is a nested state. State 246 causes initiation of an install access BPO (described below with reference to FIG. 9), state 250 causes initiation of a cancel access BPO, and state 252 causes initiation of a disconnect access BPO. Each of these are realization BPOs to handle the system-specific protocols for these tasks.

From state 246, the access interface BPO may transition to state 248 upon successful completion of the install access BPO. Alternatively, the access interface BPO may transition to state 250 if a cancellation message is received before the install access BPO completes. Note that this transition may terminate the install access BPO without regard to which state it is in. This method of termination is herein referred to as an "external termination".

In state 248, the access interface BPO waits for a message indicating that the installation processes for all of the service components have successfully completed. If such a message is received, the access interface BPO terminates. If a disconnect message is received before then, the BPO may transition to state 252.

From start state 244, the access interface BPO transitions to state 254. State 254 is a nested state that initiates a "change access" BPO. The change access BPO is a realization process that handles changes to the access component (e.g. changes to the customer want date or to the type of access). Upon successful completion of any of the nested models for states 250, 252, 254, the access interface BPO terminates.

Figure 9:
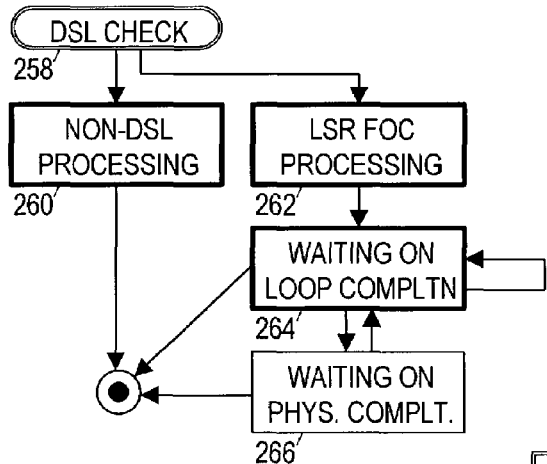
FIG. 9 shows one embodiment of an access install process.

FIG. 9 shows an example of a first portion of a realization process. The install access BPO has one start state 258. In state 258, the BPO determines whether to access type is broadband (DSL) or not. If not broadband, the BPO transitions to state 260. Otherwise it transitions to state 262. During this second transition, the workflow manager may send a message to the facilities management system to order a new loop.

State 260 is a nested state which initiates a non-DSL install BPO. The non-DSL install BPO issues an "access service request" to the facilities management system. The facilities management system may reply with a firm order confirmation once it has been determined that the premises is within the service area, and may later reply with an "installation completed" message once the physical connection has been installed by a TSP technician. This latter message may cause an external termination as the access interface BPO transitions from state 260 to a terminate state. The workflow manager sends an access complete message to the access interface BPO (FIG. 8) during this transition or other transitions to the terminate state.

State 262 is a nested state that initiates a "FOC processing" BPO (described below with reference to FIG. 10). The FOC processing BPO is externally terminated when a valid firm order confirmation (FOC) is received. Receiving such a message causes the install access BPO to transition from state 262 to state 264. The workflow manager may notify the access BPO (FIG. 7) of the FOC receipt during this transition.

State 264 is a nested state that also initiates the FOC processing BPO. The install access BPO may make a circular transition to state 264 upon receiving a subsequent valid FOC. During this transition, the workflow manager may notify the install loop test BPO (FIG. 12) of the date that this latest FOC was received. The install access BPO may transition from state 264 to the terminate state upon receiving an "installation completed" message from the facilities management server. The BPO may transition from state 264 to state 266 upon receiving a "loop complete" message from the vendor communications system. During this transition, the workflow manager may pass the loop complete message along to the facilities management system. Each of these transitions may cause an external termination of the FOC processing BPO.

In state 266, the install access BPO waits for an installation complete message from the facilities management system. Receipt of such a message will cause the BPO to transition to the terminate state, and cause the workflow manager to notify the install loop test BPO (FIG. 12) of process completion. If before such a message is received, a change message is received, the install access BPO may transition back to state 264.

Figure 10:
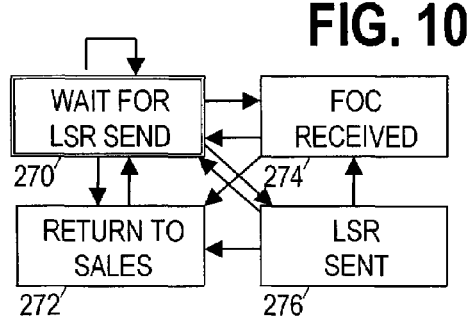
FIG. 10 shows one embodiment of a firm order confirmation (FOC) processing process.

FIG. 10 shows the FOC processing BPO, which has one start state 270. The BPO may transition to state 270 (from each of the states 270, 272, 274, 276) in response to receiving a message from the facilities management system indicating that a loop service request (LSR) should be sent. During this transition, the workflow manager sends a message to the vendor communications system. The message notifies the vendor communications system that it should send an loop service request (preferably compliant with industry standards) across the firewall to the intrastate local carrier exchange.

The FOC processing BPO may transition to state 276 when a message is received from the vendor communications system indicating that the LSR has been sent. The workflow manager may pass this message along to the facilities management system during this transition.

The FOC processing BPO may transition to state 274 (from either of states 270, 276) when a message is received from the vendor communications system indicating a firm order confirmation. During this transition, the workflow manager may pass this message along to the facilities management system.

The FOC processing BPO may transition to state 272 (from any of the other states) when a message is received from the facilities management system indicating that a message should be sent to the sales representatives to notify them of a problem with the physical installation. During this transition, the workflow manager sends a message to do just that.

Figure 11:
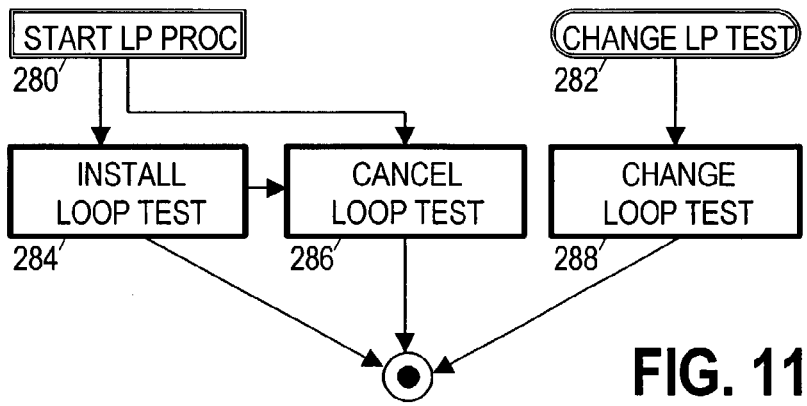
FIG. 11 shows one embodiment of a loop test interface process.

FIG. 11 shows a loop test BPO that may have been initialized by the access BPO (FIG. 8). There may be a loop test BPO for each broadband connection handled by the access BPO. The loop test BPO has two start states 280 and 282. From state 280, the BPO may transition to states 284 or 286, depending on whether the BPO was initiated by the access BPO or the remove scheduler. From start state 282, the BPO does transition to state 288.

States 284, 286 and 288 are nested states which respectively initiate an "install loop test" BPO (FIG. 12), a "cancel loop test" BPO, and a "change loop test" BPO. The install loop test BPO handles loop testing, and may be externally terminated when the loop test BPO receives a message that the package installation is complete. Such a message may cause the loop test BPO to transition from state 284 to the terminate state. The cancel loop test BPO handles canceling the loop test, and terminates after the appropriate cancellation messages have been sent. The change loop test BPO processes changes to the access type or customer want date, and sends the appropriate messages to effectuate the change.

Figure 12:
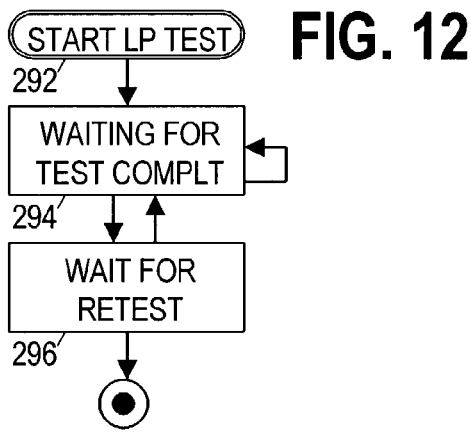
FIG. 12 shows one embodiment of a loop test install process.

FIG. 12 shows the install loop test BPO, which has one start state 292. When transitioning from state 292 to state 294, the BPO may send a message to the loop test system 136 to initiate a loop test. From state 294 the BPO may make a circular transition to state 294 in response to a message indicating a change to the customer want date. During this transition, the workflow manager may forward this change to the loop test system 136.

Figure 17:
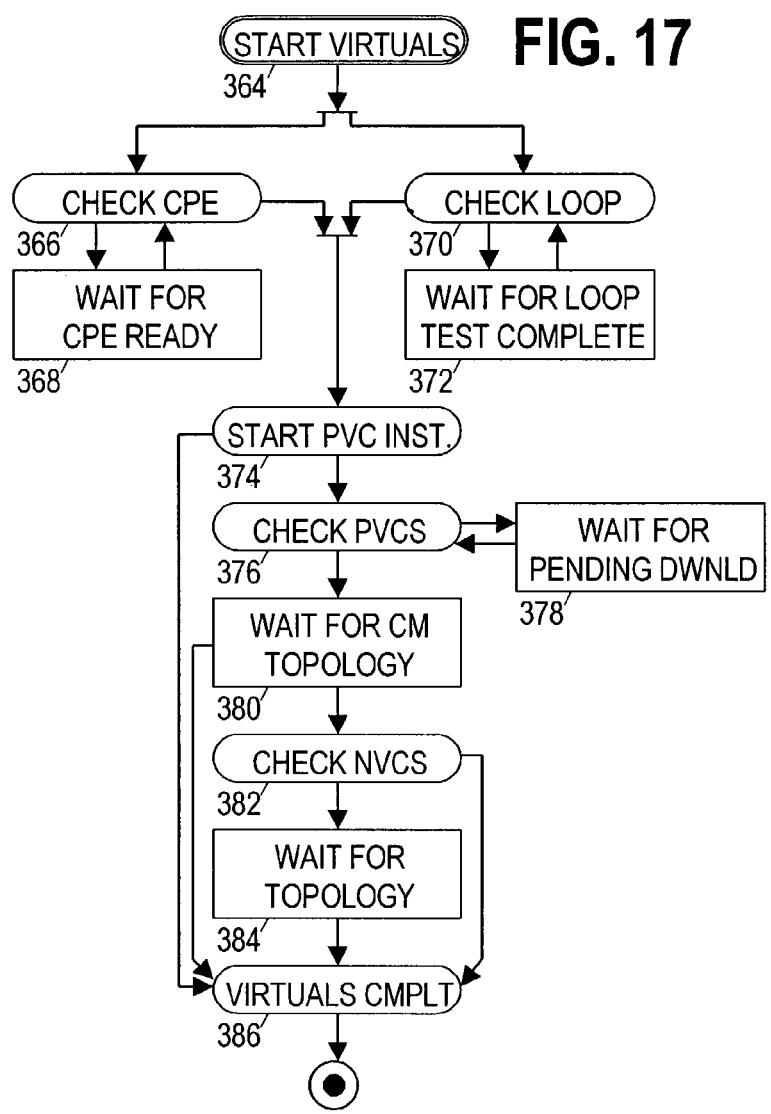
FIG. 17 shows one embodiment of a virtual components monitor process.

The install loop test BPO may transition from state 294 to state 296 when a message indicating successful completion of the loop test is received. The first time this transition is taken the workflow manager may send a successful completion message to a "virtual components" BPO (FIG. 17). From state 296, the BPO may transition back to state 294 upon determining that a time period has elapsed or upon receiving a "FOC date" message from the install access BPO (FIG. 9). During this transition, the workflow manager may send a message to the loop test system to initiate a new test. From state 296, the install loop test BPO may transition to the terminate state when a completion message is received from the install access BPO.

Figure 13:
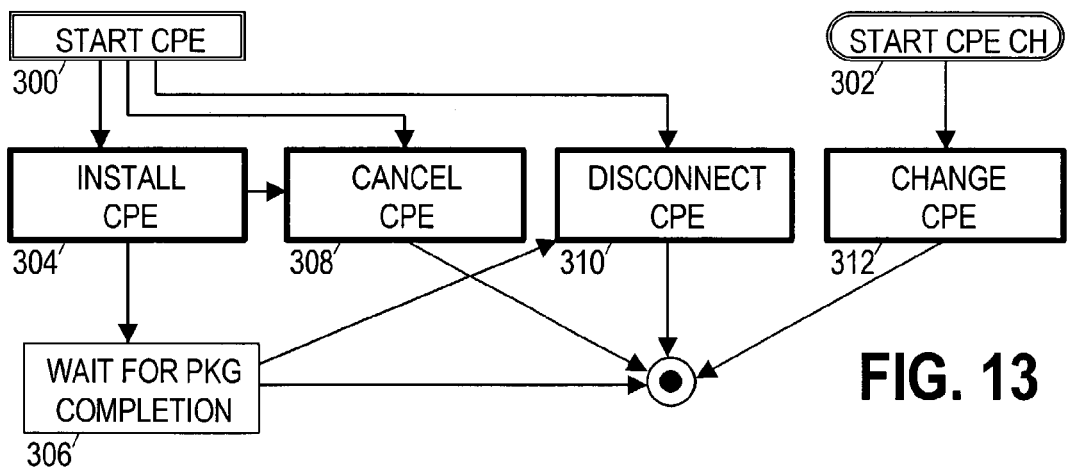
FIG. 13 shows one embodiment of a customer premises equipment (CPE) interface process.

After the firm order confirmations are received and before most of the loop testing, the initiator process (FIG. 3) transitions from state 164 to state 166, which may cause the workflow manager to initiate a CPE monitor process. In the preferred embodiment, the CPE monitor process simply initiates the CPE interface process, and accordingly, it has been omitted from the figures. FIG. 13 shows the CPE interface BPO which has two start states 300 and 302. The reader may note the similarity to the access interface BPO shown in FIG. 8 (and to FIGS. 15 and 26). In fact, the BPOs may transition between the corresponding states in similar ways. The differences lie in the precise messages that cause transitions, the BPOs initiated by the nested states, and the precise messages produced by the workflow manager in response to transitions.

As before, the BPO may transition from state 300 to states 304, 308, or 310, depending on the message that initiated the CPE interface BPO. A transition to the nested state 304 initiates the install CPE BPO. A transition to the nested state 308 initiates the cancel CPE BPO. A transition to the nested state 310 initiates the disconnect CPE BPO. The transition from the start state 302 to nested state 312 initiates the change CPE BPO. Each of these handles the system specific protocols for carrying out their respective tasks of obtaining, canceling, removing, and changing CPE. If the install CPE BPO completes successfully, the CPE interface BPO transitions to state 306. The BPO may transition from state 306 to the terminate state when a message is received indicating package completion, i.e. the completion of the installation process for all components of the TSP service package ordered by the customer.

Figure 14:
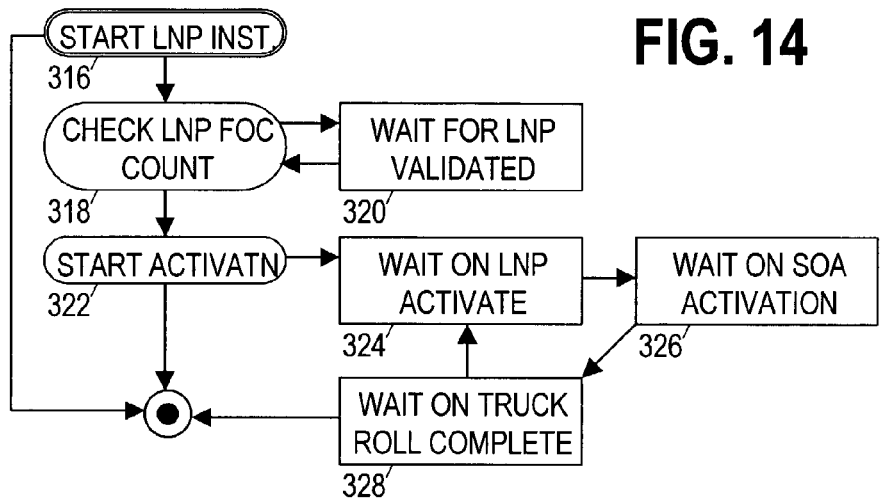
FIG. 14 shows one embodiment of a local number porting (LNP) monitor process.

The initiator process (FIG. 3) reaches nested state 168 soon after initiating the CPE interface BPO. As the initiator process reaches nested state 168, it initiates the local number portability (LNP) monitor process. FIG. 14 shows the LNP BPO, which has one start state 316.

In state 316, the LNP BPO determines whether there are any service components having a locally-ported number associated with them. If not, the LNP BPO transitions to the terminate state. Otherwise, the BPO transitions to state 318, initiating an "LNP interface" BPO for each locally-ported number. In state 318, the LNP BPO determines whether there are any LNPs that have not been validated (i.e., numbers which have not been confirmed to be portable to the service area). If so, the BPO transitions to state 320. The LNP BPO may transition from state 320 back to state 318 upon receiving a message validating an LNP. Once all LNPs have been validated, the BPO transitions to state 322. During this transition, the workflow manager may send a message to the truck roll BPO (FIG. 26) indicating that all LNPs have been validated.

In state 322, the LNP BPO determines whether a truck roll is planned (i.e. whether a visit will be made to the premises for CPE installation). If not, the BPO transitions to the terminate state. Otherwise, the BPO transitions to state 324. The BPO may transition from state 324 to state 326 when a message is received from the work force operations system 144 indicating that the LNP numbers should be activated, i.e. that the numbers should be assigned to their new location. During this transition, the workflow manager 120 sends a message to the LNP interface BPOs (FIG. 16) to activate the LNP numbers. The LNP BPO transitions from state 326 to state 328 after a suitable delay (e.g. 15 minutes). During this transition, the workflow manager may send an acknowledgment message to the work force operations system 144 to indicate that the activation has occurred.

The LNP BPO may transition from state 328 to state 324 if a message is received from the work force operations system indicating that the activation was unsuccessful. The BPO may alternatively transition from state 328 to the termination state when a message is received from a truck roll BPO (FIG. 25) indicating that the truck roll has completed successfully.

Figure 15:
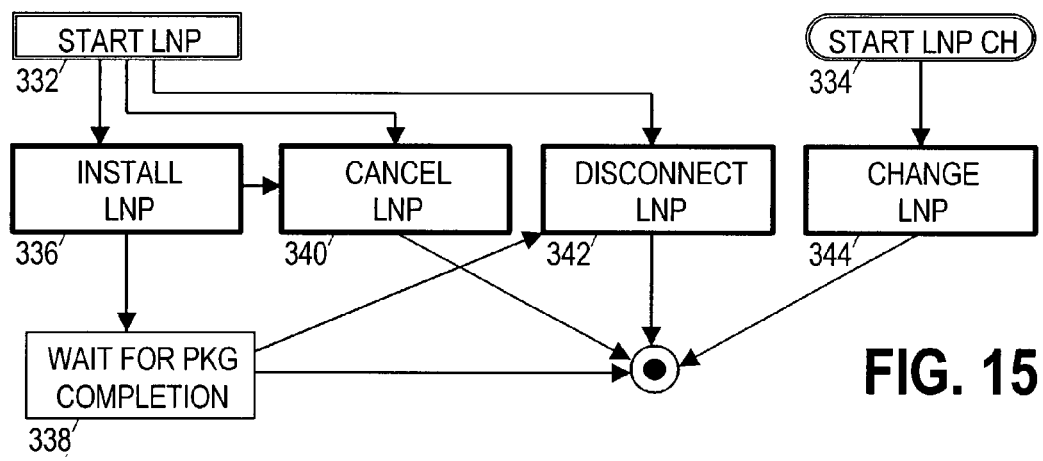
FIG. 15 shows one embodiment of a LNP interface process.

FIG. 15 shows the LNP interface BPO. This BPO is part of the monitor process for the LNP installation. The LNP BPO may initiate one LNP interface BPO for each number being ported. The states in the LNP interface BPO correspond to the states in the access interface BPO (FIG. 8). The nested states 336, 340, 342, 344 cause the initiation of realization BPOs that handle the system-specific protocol for installing, canceling, disconnecting, and changing locally ported numbers.

Figure 16:
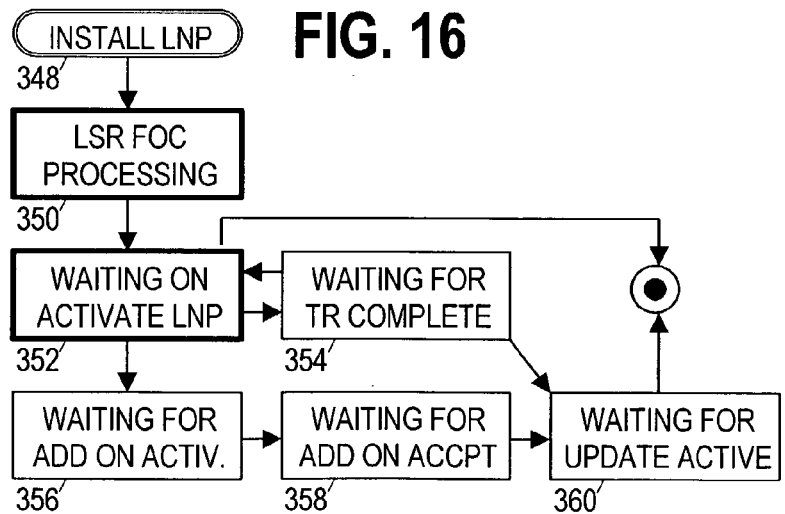
FIG. 16 shows one embodiment of a LNP install process.

FIG. 16 shows an "install LNP" BPO having one start state 348, which is a non-wait state. As the BPO transitions from state 348 to state 350, the workflow manager notifies the facilities management system that an LNP order is being processed. State 350 is a nested state that initiates a FOC processing BPO (similar to that shown in FIG. 10). The FOC processing BPO may be externally terminated by a transition to state 352 when the install LNP BPO receives a valid firm order confirmation (FOC) from the facilities management system. State 352 also initiates the FOC processing BPO. The install LNP BPO may transition from state 352 to the terminate state is a message is received from the facilities management system indicating that the LNP activation have been successfully completed.

The install LNP BPO may alternatively transition from state 352 to state 354 if a message is received from the LNP BPO indicating that the numbers should be activated. During this transition the workflow manager may send an activation message to the phone number tracking system 134. If a message is received indicating that the activation was unsuccessful, the install LNP BPO transitions back to state 352. From state 354, the LNP BPO may alternatively transition to state 360 if a message indicating that the truck roll has completed successfully. During this transition an LNP activation message may be sent to the facilities management system 130. From state 360, the LNP BPO transitions to a termination state when a message is received from the facilities management system indicating that the LNP activation has successfully completed.

From state 352, the install LNP BPO may alternatively transition to state 356 upon expiration of a timer and a determination that no truck roll is planned. The timer may be set to expire 24 hours before the customer want date. During the transition, the workflow manager 120 may send a message to a manual work queue to request a phone call to the customer alerting the customer of the impending phone number change. From state 356, the BPO may transition to state 358 when a message is received to indicate that the previous step has completed successfully. During this transition, the workflow manager 120 may send an LNP activation message to the phone number tracking system 134, and another message to a manual work queue to request a follow up phone call verifying the change. From state 358, the BPO may transition to state 360 when a message is received indicating the customer's acceptance of the change. During the transition, the workflow manager may send a message to the facilities management system finalizing the LNP activation. From state 360, the BPO may transition to the terminate state after receiving a message from the facilities management system indicating the LNP activation has successfully completed.

The initiator process (FIG. 3) also reaches state 170 after exiting CPE state 166. State 170 initiates the "virtual components" monitor processes. FIG. 17 shows the first portion of this monitor process as a "virtual components" BPO. This BPO has one start state 364, which is a non-wait state. The BPO transitions from state 364 and forks to reach states 366 and 370.

In state 366, the virtual components BPO determines whether any customer premises equipment (CPE) is still needed. If so, the BPO transitions to state 366. Otherwise, the BPO transitions to the join operation. From state 368, the BPO may transition back to state 366 upon receiving a message from the install CPE BPO that some equipment is ready.

In state 370, the virtual components BPO determines whether any loop tests have not yet been completed. If one or more remain, the BPO transitions to state 372. Otherwise, it transitions to the join operation. From state 372, the BPO may transition back to state 370 upon receiving a message from the install loop test BPO (FIG. 12) indicating that a test has completed successfully.

After the BPO reaches the join operation by both paths, the join operation completes, and the BPO transitions to state 374. In state 374 the BPO determines whether any PVC or dropside programming is needed. If not, the BPO transitions to state 386 and thence to the terminate state. Otherwise, the BPO transitions to state 376. During this transition, the workflow manager initializes an PVC interface BPO and an dropside interface BPO for each PVC-type of physical connection and each dropside-type of physical connection, respectively.

In block 376, the virtual components BPO determines whether any PVCs have not yet been programmed. If one or more remain, the BPO transitions to state 378. Otherwise, it transitions to state 380. From state 378, the BPO may transition back to state 376 upon receiving a message from an "install PVC" BPO indicating that the programming is nearly complete. During this transition, the workflow manager may send a message to the connection manager system to start a topology process.

From state 380, the virtual components BPO may transition to state 386 upon receiving a message from the physical connection manager system indicating that the PVC and dropside programming has been completed (so that no additional provisioning steps are needed). Alternatively, the BPO may transition to state 382 upon receiving a message from the physical connection manager system indicating that the programming is pending. In state 382, the BPO determines whether the new topology is required for the PVC provisioning. If not, the BPO transitions to state 386. Otherwise, the BPO transitions to state 384. During this transition, the workflow manager sends a message to request that network topology be verified. The BPO may transition from state 384 to state 386 upon receiving a response indicating a successful verification.

Figure 18:
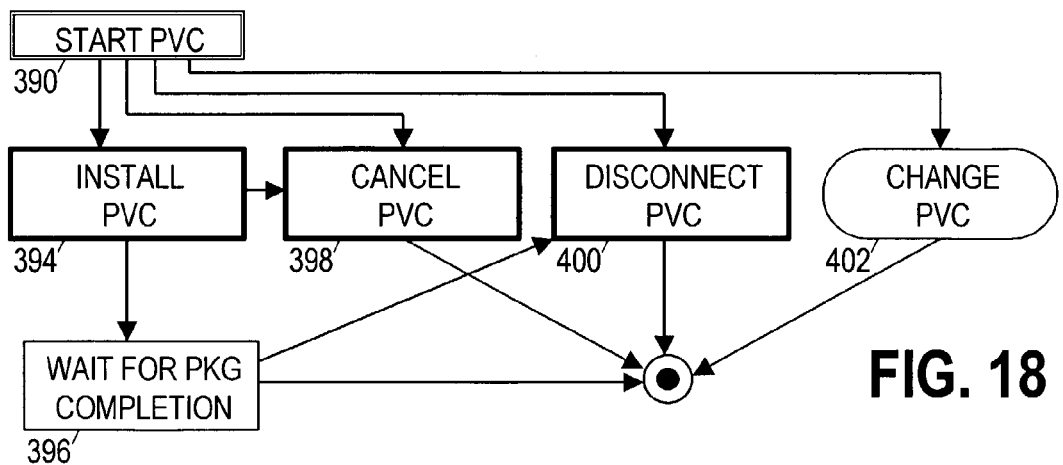
FIG. 18 shows one embodiment of a permanent virtual circuit (PVC) interface process.

FIG. 18 shows the PVC interface BPO which has a single start state 390. From state 390, the BPO may transition to states 394, 298, 400 or 402, depending on whether the BPO was initiated by an "add PVC" message from the virtual components BPO, by a "cancel PVC" message from the remove scheduler, by a "disconnect PVC" message from the remove scheduler, or by a "change PVC" message from a change scheduler BPO, respectively. States 394, 398 and 400 are nested states that respectively initiate realization BPOs for adding a PVC, canceling a PVC before it is completed, or removing a PVC after it has been completed. If the BPO for nested state 394 completes successfully, the PVC interface BPO transitions to state 396. From state 396, the BPO may transition to the terminate state upon receiving a message indicating that the installation process for the entire service package has completed successfully.

During the transition from state 390 to state 402, the workflow manager may send an acknowledgement message to the change scheduler. In state 402, the customer want date may be altered, after which the BPO transitions to the terminate state.

Figure 19:
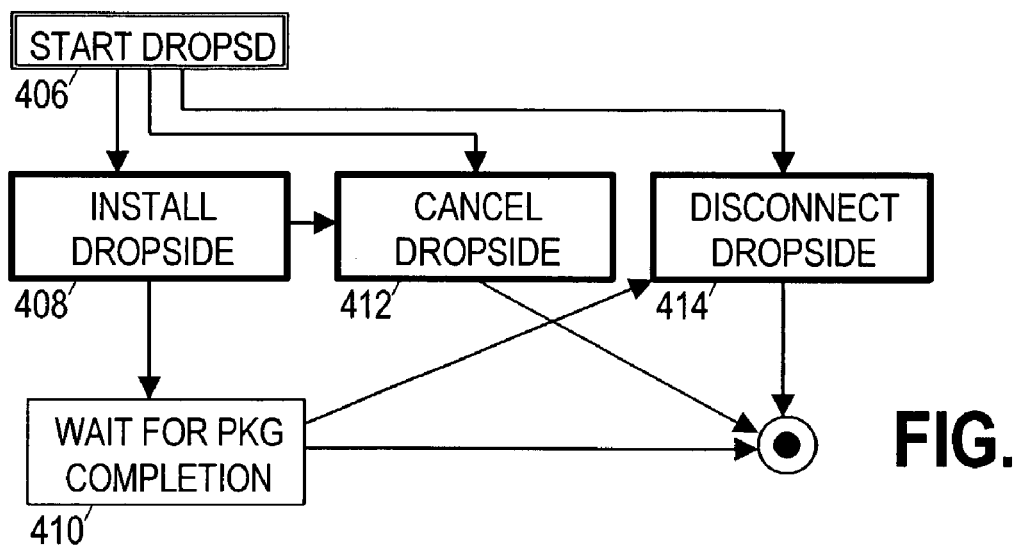
FIG. 19 shows one embodiment of a dropside interface process.

FIG. 19 shows the dropside interface BPO, which has a single start state 406. From state 406, the BPO may transition to nested states 408, 412, or 414, depending on whether the BPO receives an "add dropside" message, a "cancel dropside" message, or a "disconnect dropside message". Each of the nested states may cause the initiation of a corresponding realization BPO to handle the system-specific protocols of adding a dropside, canceling a dropside, and removing a dropside, respectively. Successful completion of the "install dropside" BPO may cause the dropside interface BPO to transition from state 408 to state 410. From state 410, the BPO may transition to the terminate state upon receiving a "package complete" message.

The virtual components BPO (FIG. 17) may receive messages from the realization BPOs for adding PVCs and dropsides. These messages may notify the virtual components BPO that programming for the PVC or dropside is nearly complete. Once the virtual components BPO terminates, the initiator BPO (FIG. 3) transitions to state 172, thereby initiating the automatic number identification features (ANI) BPO.

Figure 20:
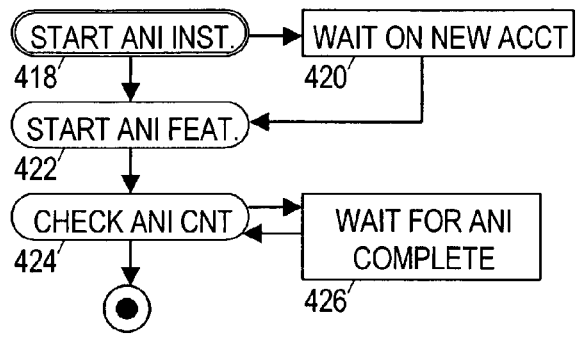
FIG. 20 shows one embodiment of an automatic number identification (ANI) monitor process.

FIG. 20 shows the ANI BPO, which is the ANI monitor process. The ANI BPO has a start state 418. In state 418, the BPO determines whether any ANI features have been requested by the customer and whether the customer has an existing account. If the customer has requested ANI features and does not have an account, the BPO transitions to state 420. Otherwise, the BPO transitions to state 422. During the transition to state 420, the workflow manager sends a message to the ANI system 148 to create a new account. The BPO may transition from state 420 to state 422 upon receiving a message from the ANI system indicating that the new account has been created.

From state 422, the BPO transitions to state 424. During the transition, the workflow manager sends messages to initiate an ANI interface BPO for each ANI component, an Group feature interface BPO for each group feature, and an E911 interface BPO for each phone number.

Figure 22:
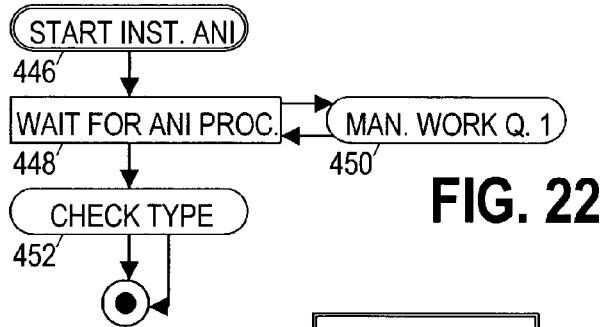
FIG. 22 shows one embodiment of an ANI install process.

In state 424, the ANI BPO determines whether any ANI components have not yet been installed. If one or more remain, the BPO transitions to state 426. The BPO may transition from state 426 back to state 424 upon receiving a message indicating completion of an "install ANI" BPO (FIG. 22). Once all ANI components have been installed, the BPO transitions to the terminate state. During this transition, the workflow manager notifies the initiator BPO that all ANI features have been installed.

Figure 21:
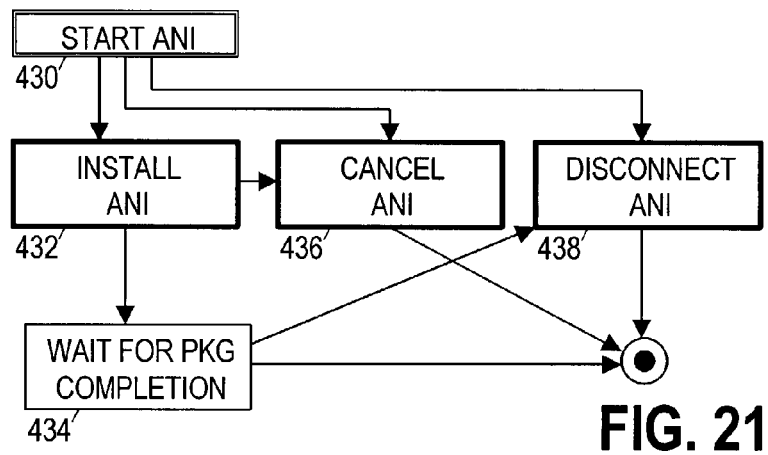
FIG. 21 shows one embodiment of an ANI interface process.

FIG. 21 shows an ANI interface BPO having a start state 430. The BPO may transition from state 430 to one of the nested states 432, 436, 438, depending on whether an "add ANI" message, "cancel ANI" message, or "disconnect ANI" message is received. The nested states each cause a realization BPO to be initiated. A transition to state 432 initiates an "install ANI" BPO, and the ANI interface BPO may transition from state 432 to state 434 upon the completion of the install ANI BPO. From state 434, the ANI interface BPO may transition to the termination state upon receipt of a "package complete" message.

FIG. 22 shows the install ANI BPO, which has a start state 446. As the BPO transitions from state 446 to state 448, the workflow manager 120 sends a message to the ANI system 148. The message may request the addition of an ANI feature. From state 448, the BPO may transition to state 450 upon receiving a message indicating a failed attempt to add an ANI feature. During the transition, the workflow manager may send an error message to the manual work queue system 124. A technician may intervene to resolve the error. From state 450, the BPO transitions back to state 448.

The install ANI BPO may transition from state 448 to state 452 upon receiving a message from the ANI system indicating that the requested ANI feature has been added. In state 452, the BPO may determine which of multiple paths to take to the terminate state, and each path may have a different message associated with it. If the BPO transitions via a first path, the workflow manager may send a message to the ANI BPO indicating that an ANI feature has been added to an existing phone number. If the BPO transitions via a second path, the workflow manager may send a message indicating that an ANI component has been installed (i.e. that a new phone number is being installed with an ANI feature).

Figure 23:
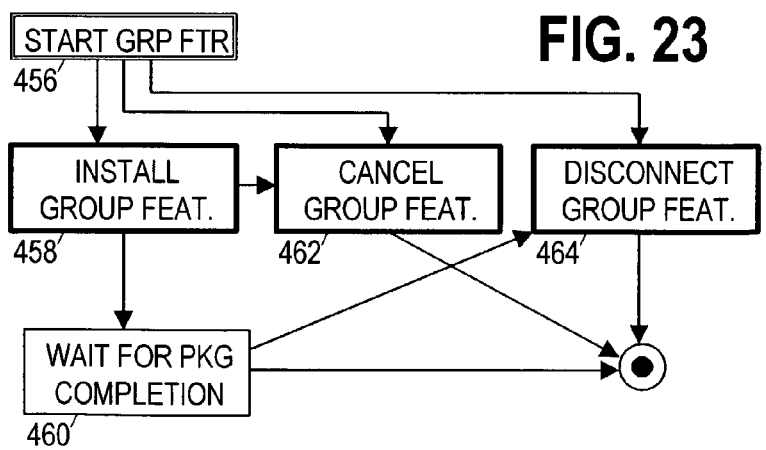
FIG. 23 shows one embodiment of a group features interface process.

FIG. 23 shows the Group features interface BPO, which has a start state 456. From state 456, the BPO may transition to nested states 458, 462, 464, which may respectively initiate an "install group features" BPO, a "cancel group features" BPO, and a "disconnect group features" BPO. A successful completion of the install group features BPO may cause the Group features interface BPO to transition from state 458 to state 460. From state 460, the BPO may transition to the terminate state upon receiving a "package complete" message.

Figure 24:
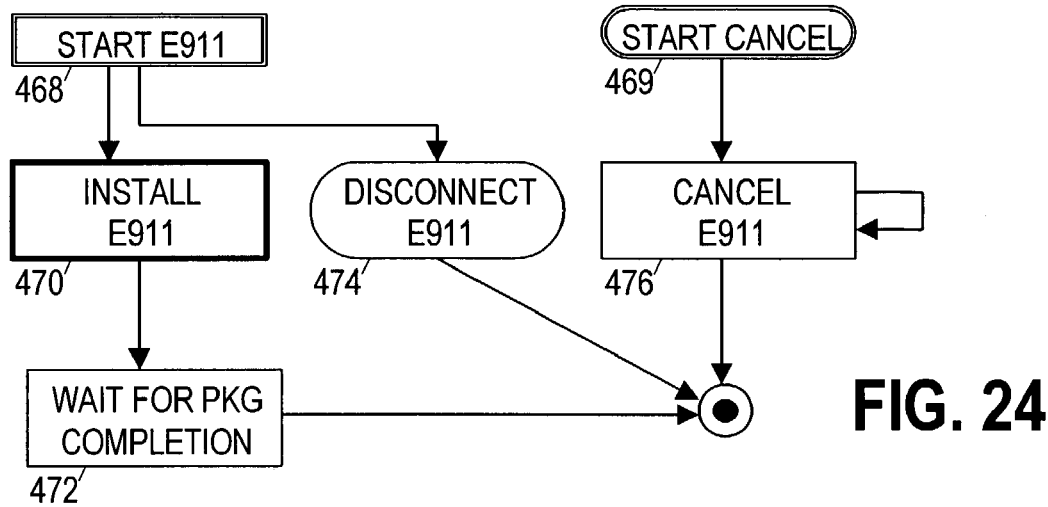
FIG. 24 shows one embodiment of an enhanced 911 (E911) interface process.

FIG. 24 shows the E911 interface BPO, which has start states 468, 469. From state 468, the BPO may transition to state 470 or 474, depending on whether an "add" message is received from the ANI BPO or whether a "disconnect" message is received from the remove scheduler. During a transition from state 468 to state 474, the workflow manager may send a disconnect message to the E911 system 140, and an acknowledgement message to the remove scheduler. The BPO may then transition from state 474 to the terminate state.

State 470 is a nested state which initiates an "install E911" BPO to provide location information to the E911 system. Successful completion of the install E911 BPO may cause the E911 interface BPO to transition from state 470 to state 472. The BPO may transition from state 472 to the terminate state upon receipt of a "package complete" message.

From start state 469, the E911 interface BPO transitions to state 476. From state 476, the BPO may make a circular transition back to state 476 in response to a cancel component message from the remove scheduler. During this transition, the workflow manager may send a "disconnect" message to the E911 system 140 to remove useless location information. The BPO may transition from state 476 to the terminate state upon determining that all ANI components have been canceled.

Figure 25:
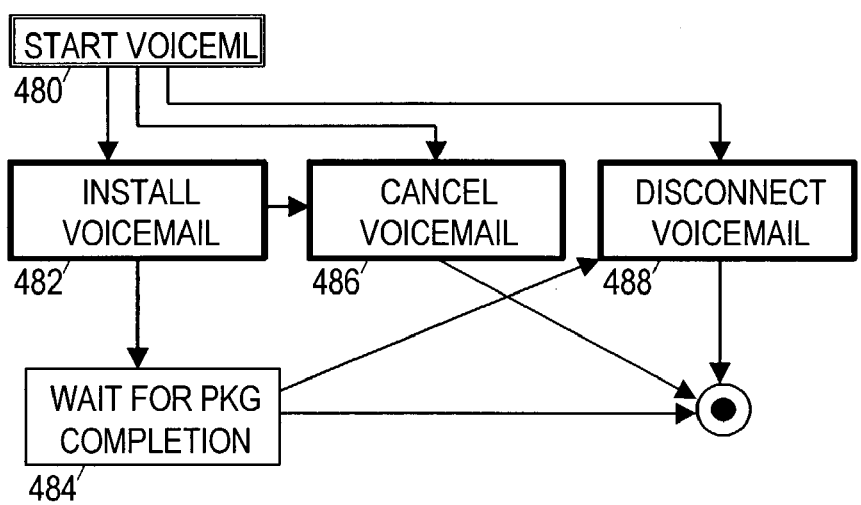
FIG. 25 shows one embodiment of a voicemail interface process.

FIG. 25 shows a voicemail interface BPO having a start state 480. From state 480, the BPO may transition to nested states 482, 486, or 488, depending on the message received. These nested states may respectively cause an "install voicemail" BPO, a "cancel voicemail" BPO, and a "disconnect voicemail" BPO. These BPOs may handle the system-specific protocols for respectively adding, canceling, and removing a voicemail account on voicemail system 142. The voicemail interface BPO may transition from states 486 or 488 to the terminate state after successful completion of the cancel and disconnect BPOs. After successful completion of the add voicemail BPO, the voicemail interface BPO may transition from state 482 to state 484. From state 484, the BPO may transition to the terminate state upon receiving a "package complete" message.

Figure 26:
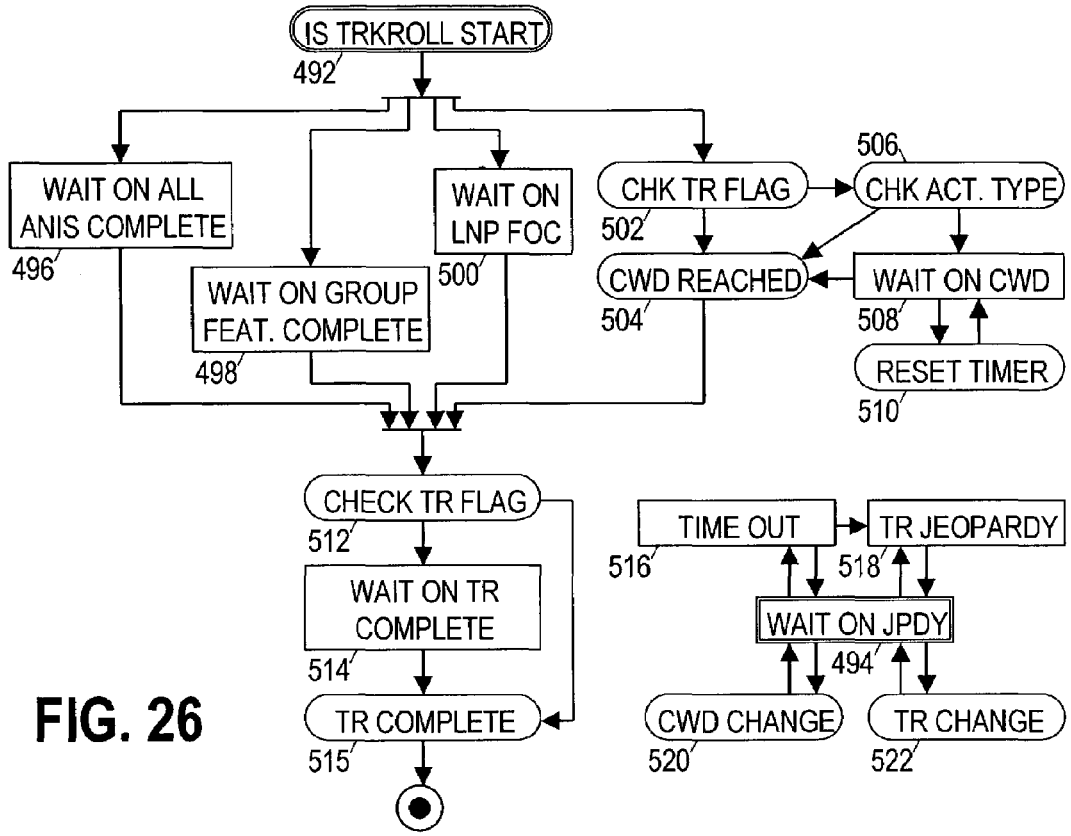
FIG. 26 shows one embodiment of a truck roll monitor process.

Referring back to FIG. 3, when the initiator process reaches nested state 174, the workflow manager initiates the truck roll BPO which is shown in FIG. 26. The truck roll BPO has two start states 492, 494. From state 492, the BPO transitions through a fork operation to each of states 496, 498, 500, and 502. From state 496, the BPO may transition to a join operation upon receiving a message from the ANI BPO indicating successful completion. From state 498, the truck roll BPO may transition to the join operation upon receiving a message from the add group feature BPO indicating successful completion. From state 500, the BPO may transition to the join operation upon receiving a message from the LNP BPO indicating that all valid FOCs have been received for all LNPs.

Figure 27:
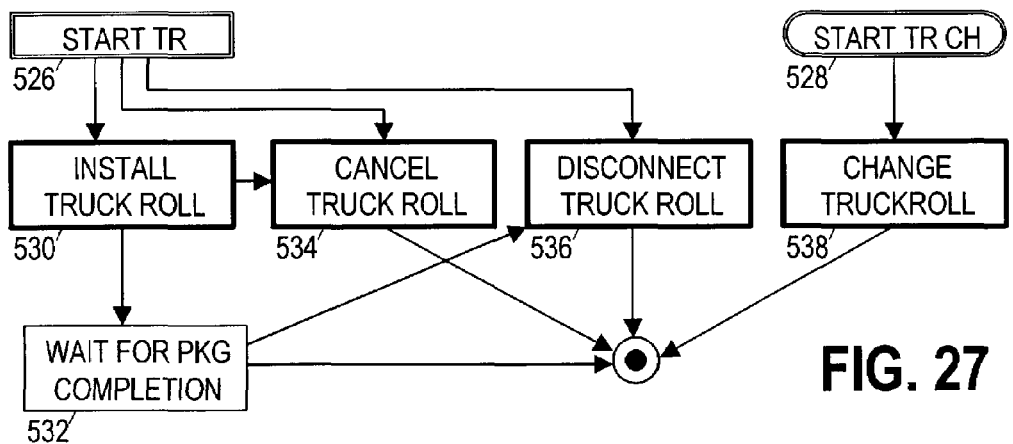
FIG. 27 shows one embodiment of a truck roll interface process.

In state 502, the truck roll BPO determines whether a truck roll is planned. If so, the BPO transitions to state 504. During this transition, the workflow manager initiates the truckroll interface BPO (FIG. 27). Otherwise, the truck roll BPO transitions to state 506 In state 506, the BPO determines whether the customer's order is an add-on to an existing installation, or whether this is a new installation. If there is an existing installation, the BPO transitions to state 504. Otherwise, the BPO transitions to state 508.

From state 508, the BPO may transition to state 504 upon determining that the customer want date has been reached.

From state 508, the truck roll BPO may alternatively transition to state 510 in response to a message from the change scheduler changing the customer want date. In state 510, the date is adjusted, and the BPO transitions back to state 508. The BPO may also transition from state 508 to state 504 upon receiving a message requesting a truck roll. During this latter transition, the workflow manager may initiate the truckroll interface BPO.

From state 504, the truck roll BPO transitions to the join operation. Once the BPO has traversed all four transitions to the join operation, the BPO reaches state 512. In state 512, the BPO again determines whether a truck roll is planned. If so, the BPO transitions to state 514. During this transition, the workflow manager may send a message to an "add truckroll" BPO indicating that the truck roll should proceed. If no truck roll is planned, the BPO transitions from state 512 to 515.

The truck roll BPO may transition to state 515 from state 514 upon receiving a message from the add truck roll BPO indicating successful completion. During this transition the workflow manager may send welcoming emails to new broadband customers via the email server system 126. From state 515 the BPO may transition to the terminate state. During this transition, the workflow manager may send a message to the E911 system 140 indicating that installation is complete.

In start state 494, the truck roll BPO waits for a timer to elapse. The timer may be set to expire about three days before the customer want date. Upon expiration of the timer, the BPO may transition to state 516 if a truck roll is planned. In state 516, the BPO may determine whether the prerequisites (states 496-500) of the truck roll have been satisfied. If not, the BPO may transition to state 518. During this transition, the workflow manager 120 may issue a message to alert a designated party or process that the customer want date may be missed, and identifying which systems are holding up the truck roll. From states 516 and 518, the BPO may transition back to state 494 upon receiving a message indicating that the customer want date has changed.

From state 494, the truck roll BPO may transition to state 520 upon receiving a message indicating that the customer want date has changed. In state 520, the BPO resets the timer, and the BPO transitions back to state 494. From state 494, the BPO may transition to state 522 upon receiving a message indicating that a truck roll is being planned, whereas it had previously been unplanned. In state 522, the BPO updates a flag, and transitions back to state 494.

FIG. 27 shows the truckroll interface BPO, which resembles the previously described interface BPO of FIG. 8. The BPO may transition from start state 526 to nested states 530, 534, 536, which respectively initiate an "add truckroll" BPO, a "cancel truckroll" BPO, and a "disconnect truckroll" BPO. The add truckroll BPO handles the system-specific protocols for dispatching a truck to deliver and install CPE. The interface BPO may transition to state 532 upon successful completion of the add truckroll BPO. From state 532, the truckroll interface BPO may transition to the terminate state upon receiving a "package complete" message.

The cancel truckroll BPO handles the system-specific protocols for canceling an in-progress delivery. The truckroll interface BPO may transition to the terminate state upon successful completion by the cancel truckroll BPO.

The disconnect truckroll BPO handles the system-specific protocols for dispatching a truck to disconnect and remove CPE. The truckroll interface BPO may transition to the terminate state upon successful completion by the disconnect truckroll BPO.

From start state 528, the truckroll interface BPO transitions to state 538, thereby initiating a "change truckroll" BPO. The change truckroll BPO handles the system specific protocols for changing truckroll parameters, such as: changing the customer want date, changing the CPE components to be installed, and canceling service components.

Figure 28:
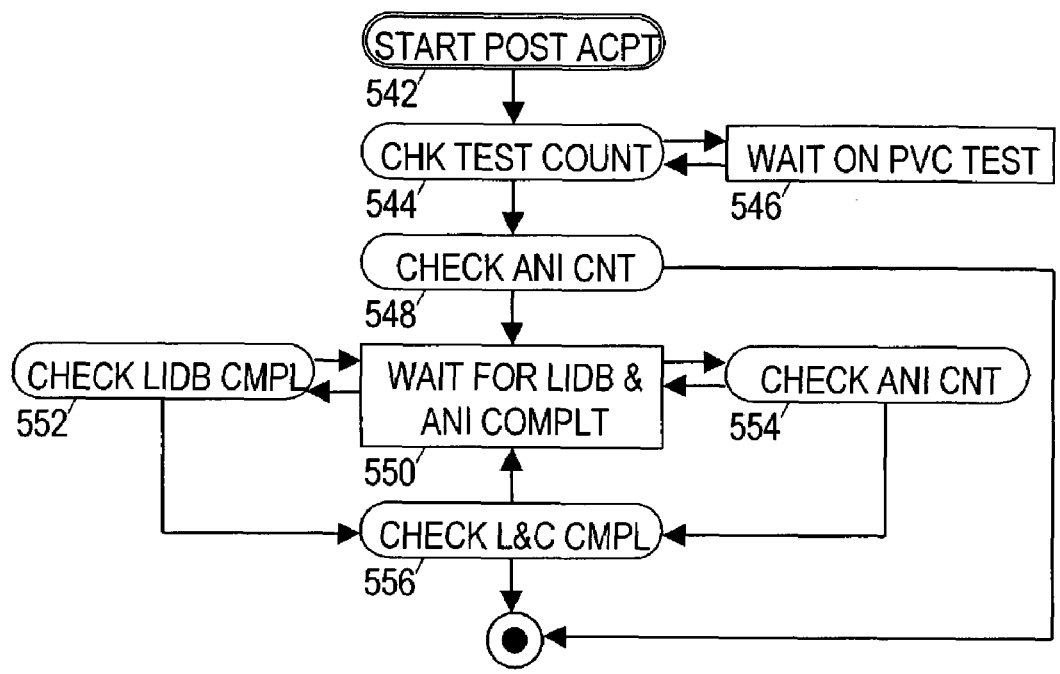
FIG. 28 shows one embodiment of a post acceptance monitor process.

When the truck roll BPO completes, the initiator BPO (FIG. 3) reaches nested state 176, thereby initiating a post-acceptance BPO. FIG. 28 shows a post-acceptance BPO having a start state 542. From state 542, the BPO transitions to state 544. In state 544, the BPO determines whether all the tests of the virtual circuits have completed successfully. If one or more remain to be done, the BPO transitions to state 546. From state 546, the BPO may transition back to state 544 upon receiving a message from the add PVC BPO or add dropside BPO indicating successful completion. Once all virtual circuit tests have completed successfully, the BPO transitions to state 548.

In state 548, the post-acceptance BPO determines whether the installed service components are to include any ANI features. If not, the BPO transitions to the terminate state. Otherwise, the BPO transitions to state 550. During this transition, the workflow manager may send a series of LIDB entries to the LIDB system 146.

From state 550, the post-acceptance BPO may transition to state 552 upon receiving a message from the LIDB system 146 indicating that the system has accepted line information for a physical connection. In state 552, the BPO may determine whether any further LIDB transactions are pending. If so, the BPO transitions back to state 550. Otherwise, the BPO transitions to state 556.

From state 550, the post-acceptance BPO may alternatively transition to state 554 upon receiving a message from the add ANI BPO indicating that the ANI system has successfully installed an ANI component. In state 554, the post-acceptance BPO determines whether any further ANI transactions are pending, and if so, the BPO transitions back to state 550. Otherwise, the BPO transitions to state 556.

In state 556, the post-acceptance BPO determines if all LIDB and ANI transactions have completed. If not, the BPO transitions back to state 550. Otherwise, the BPO transitions to the terminate state.

In the above description, some of the interface BPOs were noted to be waiting for "package complete" messages. These messages may be sent to each of the interface BPOs by the initiator process as it transitions to state 184.

The system outlined above greatly reduces the installation time for subscribers to new telecommunications services. The use of jeopardy timers prevents orders from languishing when problems are encountered. The modularity of the BPOs greatly benefits the ability to maintain the system through updating of modules. Because each module that is updated or replaced has a much more limited scope, it is much more straightforward for a software engineer to update any orders that were caught in the module being updated. One contemplated modification is to configure many of the interface BPOs to send a message to the customer information system to initiate billing upon the installation of a given service component. Hence, the billing for (e.g.) a voicemail service may begin as soon as the voicemail service is activated, even though (e.g.) an ANI service is not yet active.

Numerous variations and modifications will become apparent to those skilled in the art once the above disclosure is fully appreciated. It is intended that the following claims be interpreted to embrace all such variations and modifications.

What is claimed is:

1. A telecommunications service provisioning method which comprises:

accepting order entry notifications of orders for services provided by a telecommunications service provider; and initiating, by way of a workflow manager, an initiator process for each order entry notification of an order for service provided by the telecommunications provider, wherein the initiator process is configured to initiate, by way of the workflow manager, a plurality of monitor processes to fulfill the order for service, wherein each of the plurality of monitor processes includes a set of steps that operate to provide one or more of a plurality of different features of the order for service provided by telecommunications service provider;

operating at least two of the plurality of monitor processes concurrently;

tracking progress of the order for service through each of the plurality of monitor processes with a corresponding object instance for each of the plurality of monitor processes;

initiating, by way of the workflow manager, one or more interface processes for each of the plurality of the monitor processes; and receiving commands by each of the one or more interface processes to install one of the plurality of different features of the order for service, to cancel the one of the plurality of different features of the order for service prior to completing the installation of the one of the plurality of different features of the order for service, or to disconnect the one of the plurality of different features of the order for service subsequent to completing the installation of the one of the plurality of different features of the corresponding order for service, and wherein the one or more interface processes persist after each of the one or more interface processes report successful installation of the one of the plurality of different features of the corresponding order for service until the initiator process terminates the one or more interface processes upon completing all of the set of steps included in each of the plurality of monitor processes initiated to fulfill the order for service.

2. The method of claim 1, wherein the plurality of monitor processes include:

an access process configured to arrange for installation of a connection between a premises and a communications network; and a truck roll process configured to arrange for a visit to a premises for installation of customer premises equipment (CPE).

3. The method of claim 1, wherein the plurality of monitor processes include:

a CPE process configured to arrange for ordering of CPE for delivery or delivery and installation at the customer premises.

4. The method of claim 3, wherein the plurality of monitor processes include:

a local number porting (LNP) process configured to arrange for transfer of a phone number to the premises.

5. The method of claim 4, wherein the plurality of monitor processes further include:

a virtual components process configured to arrange for programming of switches to accept communications directed to and from the premises, wherein the LNP process and the virtual components process are included the at least two processes that operate concurrently.

6. The method of claim 4, wherein the plurality of monitor processes further include:

an automatic number identification (ANI) process configured to arrange for provision of ANI services to the premises, wherein at least one of the ANI services is an alternately-billed aspect of the telecommunications service.

7. The method of claim 4, wherein the plurality of monitor processes include one or more alternately-billed installation process, each alternately-billed installation process installs one of a plurality of alternately-billed features of the telecommunications service including at least voice mail, caller id, call blocking, automatic call back, and selective call forwarding, and wherein the plurality of monitor processes further include a post-acceptance process configured to initiate billing a customer for each alternately-billed aspect of the telecommunications service upon completion of each of the one or more alternately-billed installation processes.

8. The method of claim 2, wherein the access process is configured to initiate, by way of the workflow manager, one interface process for each connection to be installed.

9. The method of claim 8, wherein each interface process is configured to initiate, by way of the workflow manager, an install process, wherein each install process is configured to issue an access service request to a facilities management system if the connection is for non-broadband access, and to issue a loop service request if the connection is for broadband access.

10. The method of claim 9, wherein the install process is configured to initiate, by way of the workflow manager, a loop test process upon receiving an order confirmation from the facilities management system.

11. The method of claim 10, wherein the loop test process is configured to issue a loop test request to a loop test system, and is further configured to subsequently issue additional loop test requests to the loop test system after receiving successful test completion messages from the loop test system.

12. The method of claim 10, wherein the install process is further configured to notify the access process upon receiving the order confirmation, and wherein the access process is configured to notify the initiator process once order confirmations have been received for all broadband connections to the premises.

13. A telecommunications provisioning system which comprises:

an order entry system;

a workflow manager system coupled to the order entry system to receive order entry information, wherein the workflow manager is configured to implement a provisioning process for each order entry, wherein the provisioning process configures the workflow manager to coordinate the concurrent operations of different systems that provide different aspects of a telecommunications service;

a facilities management system coupled to the workflow manager system to receive service requests for installing communications access from a premises to a telecommunications network; and a loop test system configured to test the communications access after installing the communications access and in response to receiving an order confirmation from the facilities management system and further configured to subsequently issue additional loop test requests to the loop test system during the provisioning process and after receiving successful test completion messages from the loop test system, wherein the subsequently issued additional loop test request to the loop test system is periodically issued after every predetermined period of time has elapsed subsequent to receiving the successful test completion messages from the loop test system, is issued upon receiving a subsequent order confirmation, or is issued upon a change in a customer want date.

14. The system of claim 13, further comprising:
a phone number tracking system coupled to the workflow manager system to receive phone activation information; and
a virtual circuits system coupled to the workflow manager system to receive requests for creating permanent virtual circuits (PVCs),
wherein the provisioning process configures the workflow manager to send a request for a phone number transfer to the phone number tracking system, and concurrently sends a request to create a PVC to the virtual circuits system.

15. The system of claim 14, wherein the provisioning process configures the workflow manager to execute an initiator process that initiates a set of processes that operate concurrently to coordinate the concurrent operations of the facilities management system, the CPE order system, the phone number tracking system, and the virtual circuits system.

16. The system of claim 15, wherein one or more of the processes in the set of processes include corresponding interface processes that persist after the one or more processes report successful completion.

17. The system of claim 16, wherein the interface processes are configured to arrange for installation, canceling, and disconnecting of some telecommunications service component.

18. The system of claim 13, further comprising:
a customer premises equipment (CPE) order system coupled to the workflow manager system to receive orders for CPE,
wherein the provisioning process configures the workflow manager to send a CPE order to the CPE order system after receiving the order confirmation from the facilities management system and without waiting for completed installation of the communications access.

19. A telecommunications service provisioning method which comprises:
accepting order entry notifications of orders for services provided by a telecommunications service provider; and
initiating, by way of a workflow manager, an initiator process for each order entry notification of an order for service provided by the telecommunication provider, wherein the initiator process is configured to initiate, by way of the workflow manager, a plurality of monitor processes to fulfill the order for services, wherein each of the plurality of monitor processes includes a set of steps that operate to provide one or more of a plurality of different features of the order for service provided by telecommunications service provider, wherein the plurality of different features of the telecommunication service includes two or more of a communications access, customer premises equipment, local number portability, a permanent virtual circuit, a dropside interface, automatic number identification, a group feature, enhanced 911, or voicemail;
operating at least two of the plurality of monitor processes concurrently;
tracking progress of the order for service through each of the plurality of monitor processes with a corresponding object instance for each of the plurality of monitor processes;
initiating, by way of the workflow manager, one or more interface processes for each of the plurality of the monitor processes; and
receiving commands by each of the one or more interface processes to install one of the plurality of different features of the order for service, to cancel the one of the plurality of different features of the order for service prior to completing the installation of the one of the plurality of different features of the order for service, or to disconnect the one of the plurality of different features of the order for service subsequent to completing the installation of the one of the plurality of different features of the corresponding order for service, and wherein the one or more interface processes persist after each of the one or more interface processes report successful installation of the one of the plurality of different features of the corresponding order for service until the initiator process terminates the one or more interface processes upon completing all of the set of steps included in each of the plurality of monitor processes initiated to fulfill the order for service.

* * * * *